Figure 1:
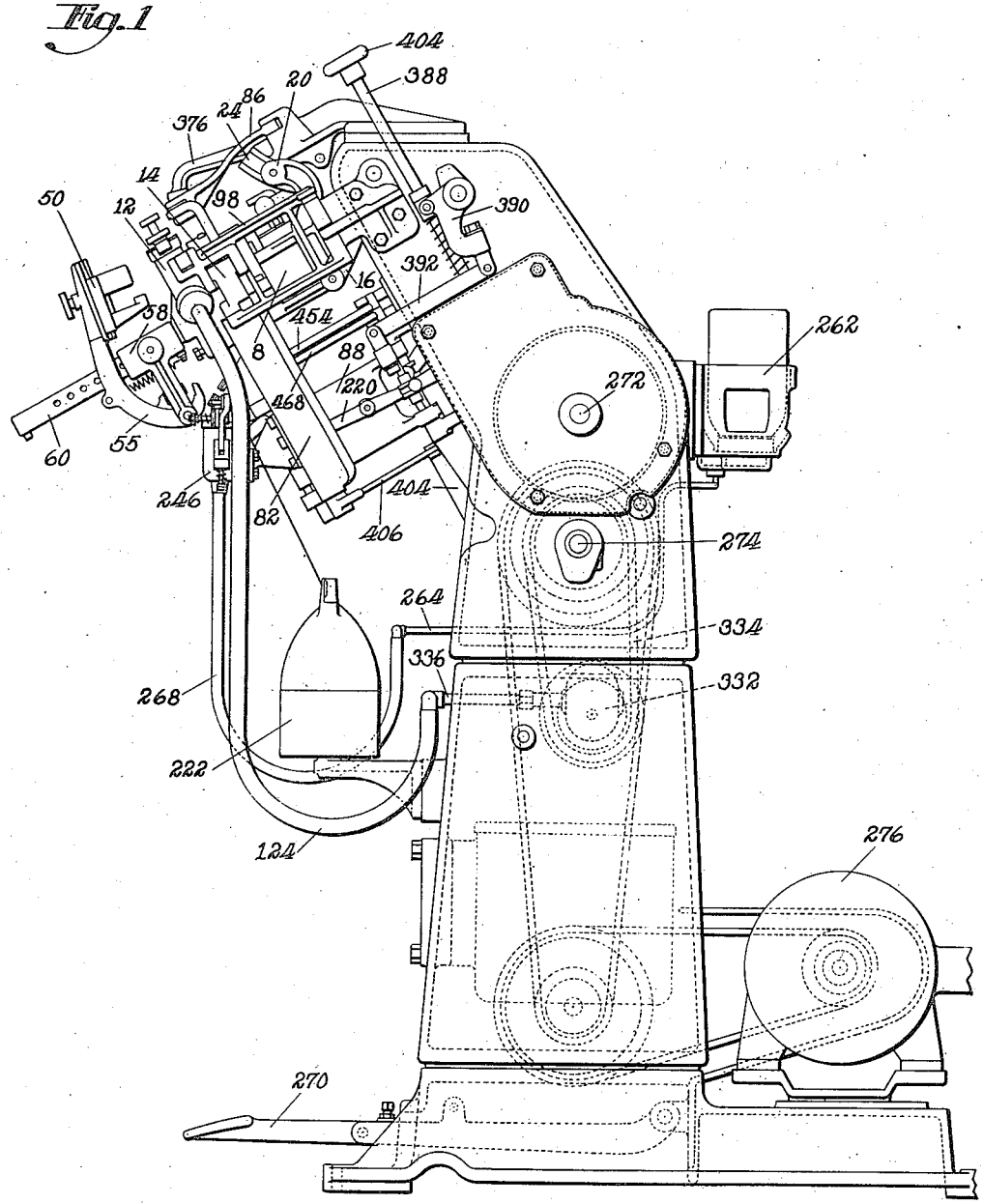

Jan. 26, 1943.   E. A. HOLMGREN   2,309,110
PULLING OVER MACHINE
Filed June 30, 1941   28 Sheets-Sheet 1

Jan. 26, 1943.  E. A. HOLMGREN  2,309,110
PULLING OVER MACHINE
Filed June 30, 1941  28 Sheets-Sheet 3

Witness
H. E. Van Dine

Inventor
Eric A. Holmgren
by Fish Hildreth
Cary & Jenney Attys.

Jan. 26, 1943.  E. A. HOLMGREN  2,309,110
PULLING OVER MACHINE
Filed June 30, 1941   28 Sheets-Sheet 6

Witness
H. E. Van Dine

Inventor
Eric A. Holmgren
by Fish Hildreth
Cary & Jenney Attys

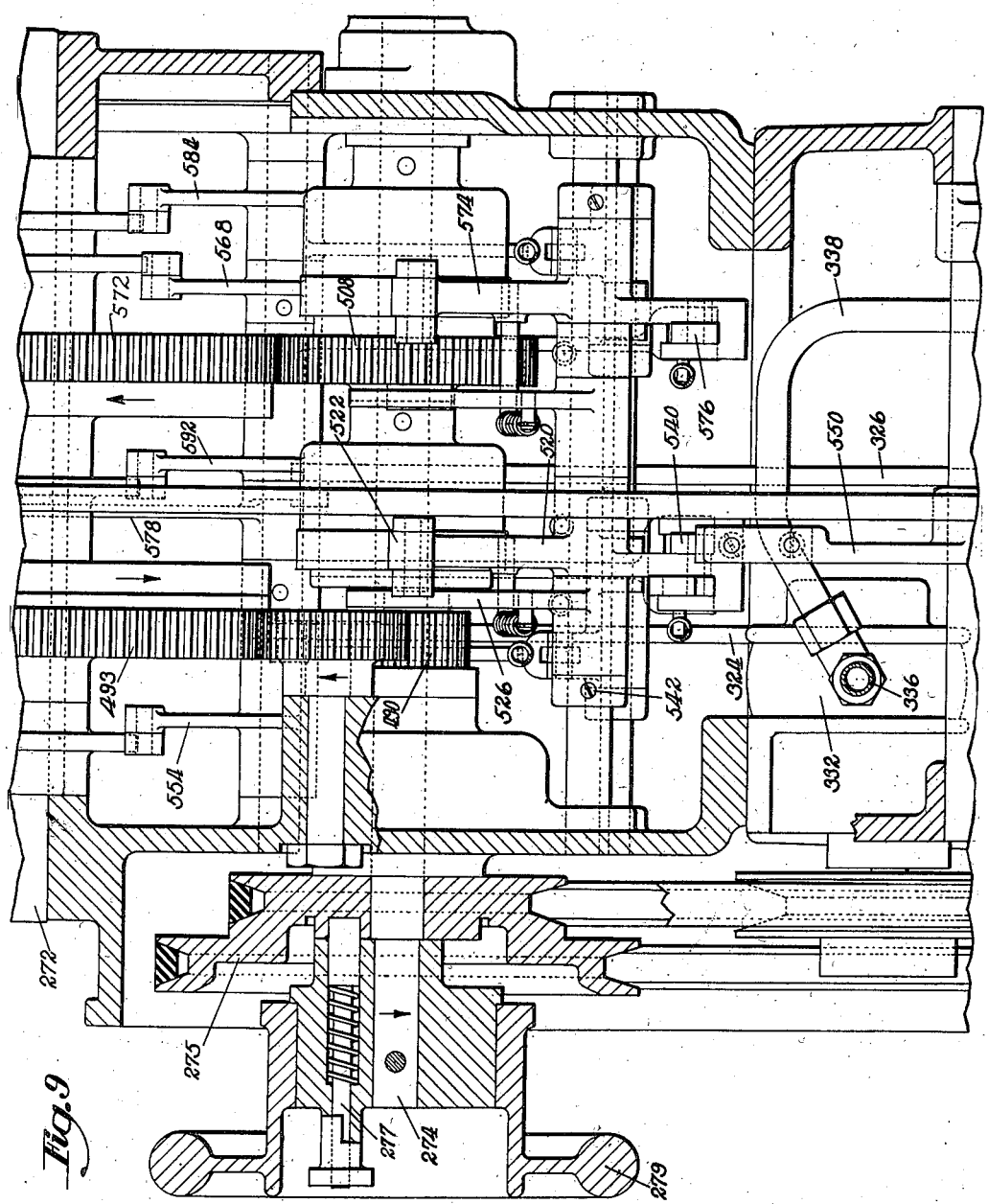

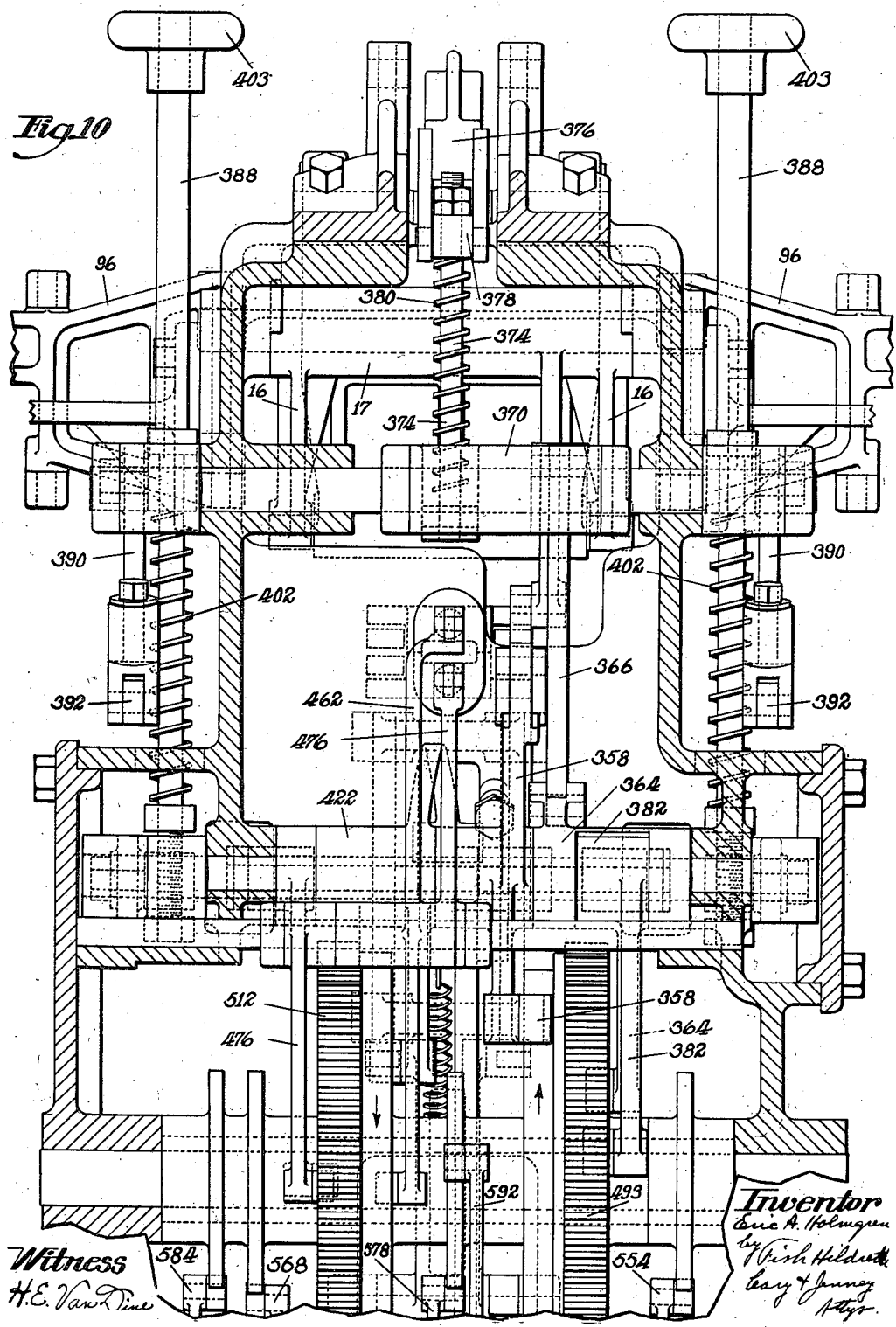

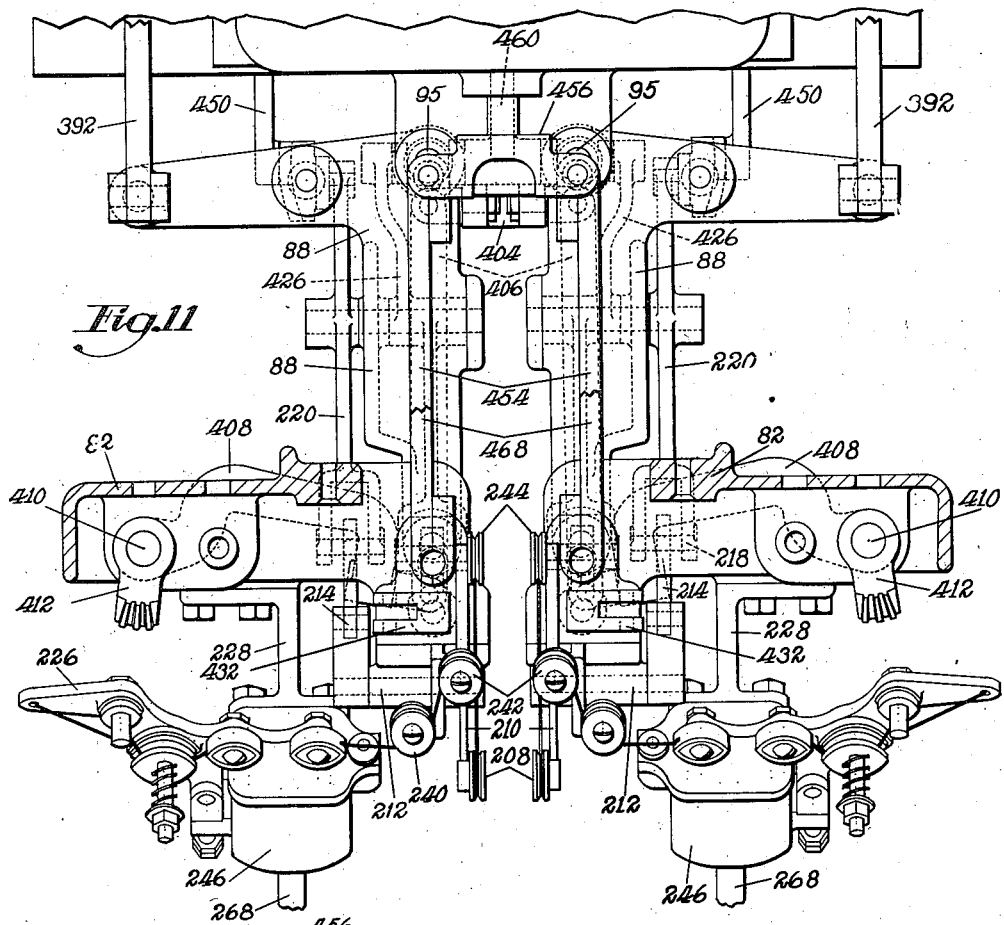
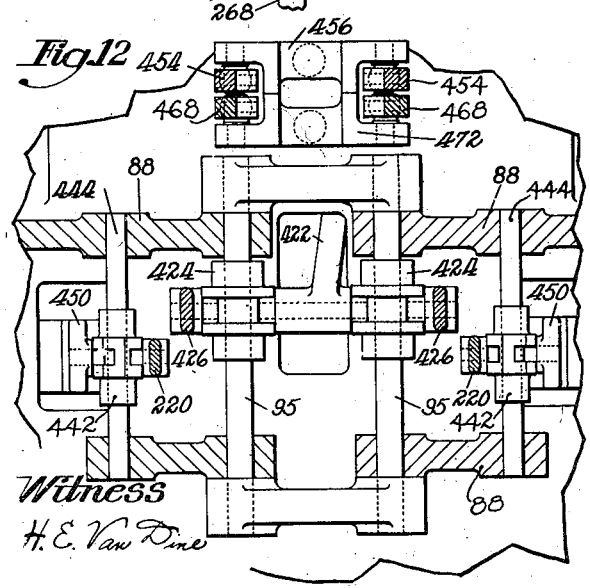
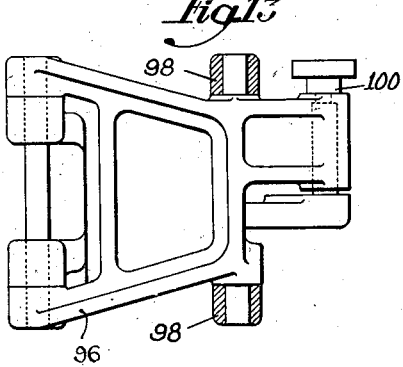

Jan. 26, 1943.　　　E. A. HOLMGREN　　　2,309,110
PULLING OVER MACHINE
Filed June 30, 1941　　　28 Sheets-Sheet 10

Witness
H. E. Van Dine

Inventor
Eric A. Holmgren
by Fish Hildreth
Cary & Jenney Attys.

Jan. 26, 1943.  E. A. HOLMGREN  2,309,110
PULLING OVER MACHINE
Filed June 30, 1941  28 Sheets-Sheet 11

Inventor
Eric A. Holmgren
By Fish Hildreth
Cary & Jenney Attys

Witness
H. E. Van Dine

Jan. 26, 1943.     E. A. HOLMGREN     2,309,110
PULLING OVER MACHINE
Filed June 30, 1941     28 Sheets-Sheet 12
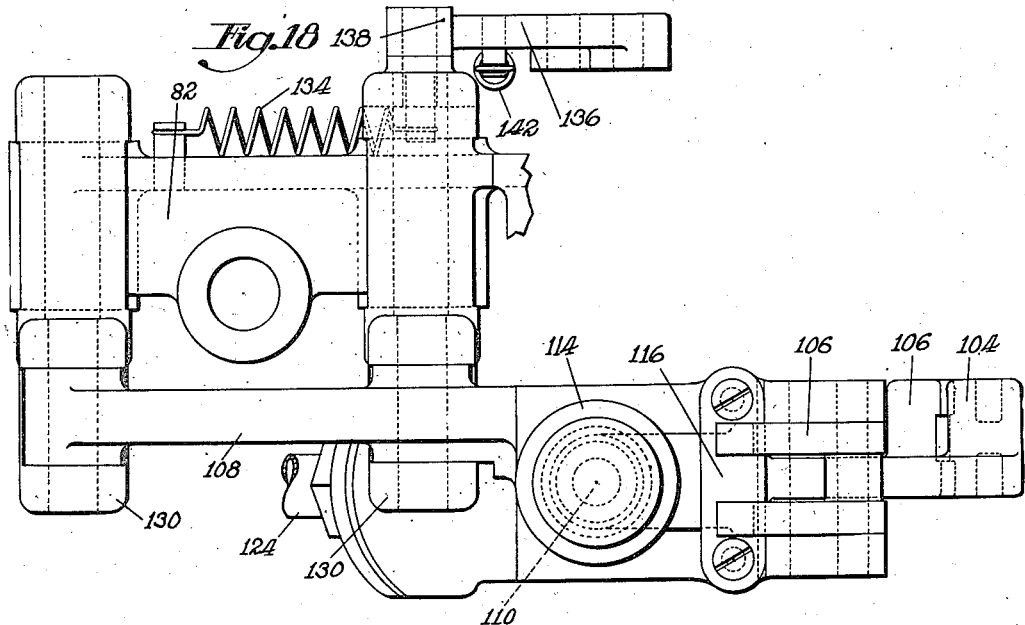
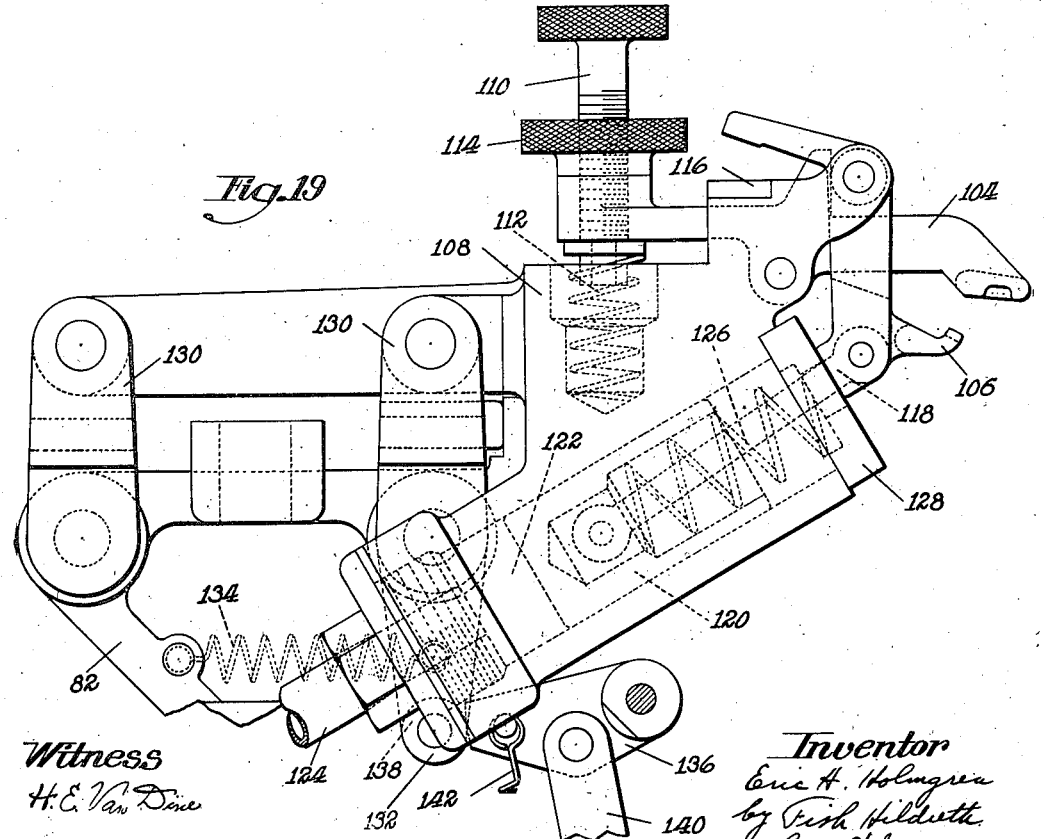

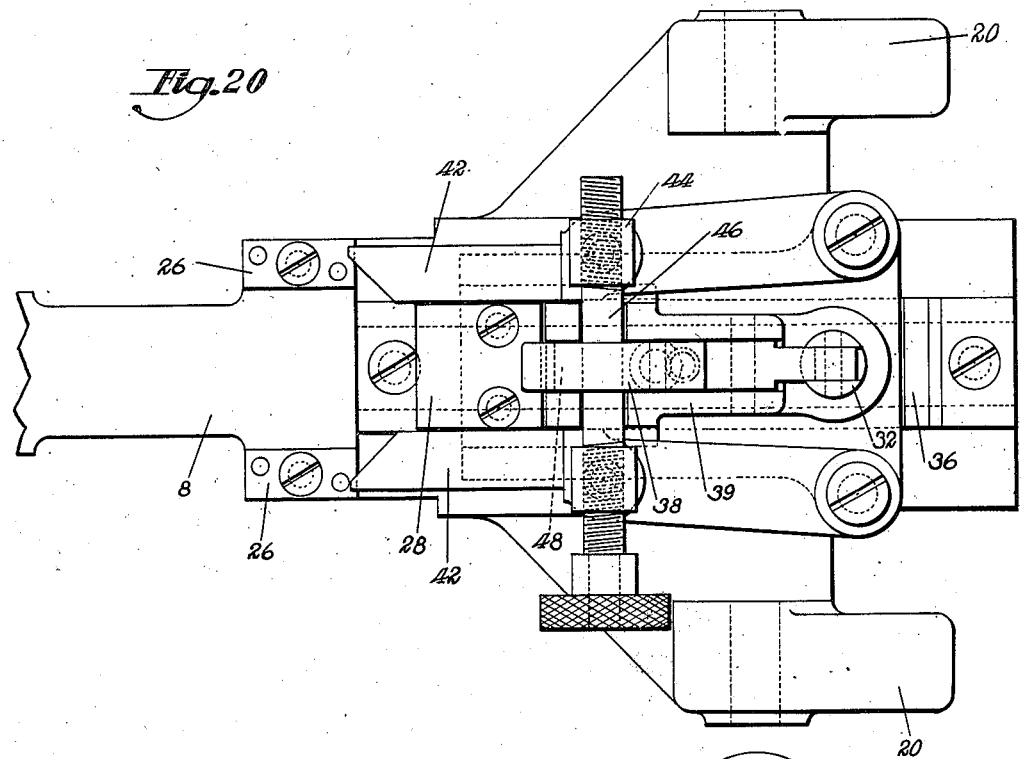
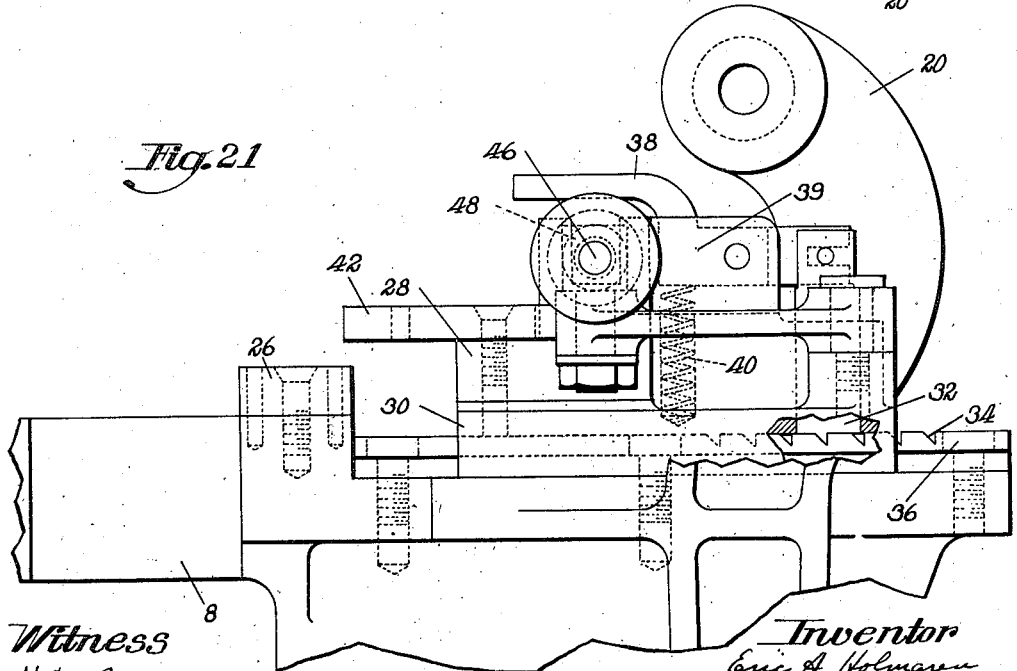

Jan. 26, 1943.  E. A. HOLMGREN  2,309,110
PULLING OVER MACHINE
Filed June 30, 1941  28 Sheets-Sheet 14

Witness
H. E. Van Dine

Inventor
Eric A. Holmgren
by Fish Hildreth
Cary & Jenney Attys.

Jan. 26, 1943.　　　E. A. HOLMGREN　　　2,309,110
PULLING OVER MACHINE
Filed June 30, 1941　　　28 Sheets-Sheet 15

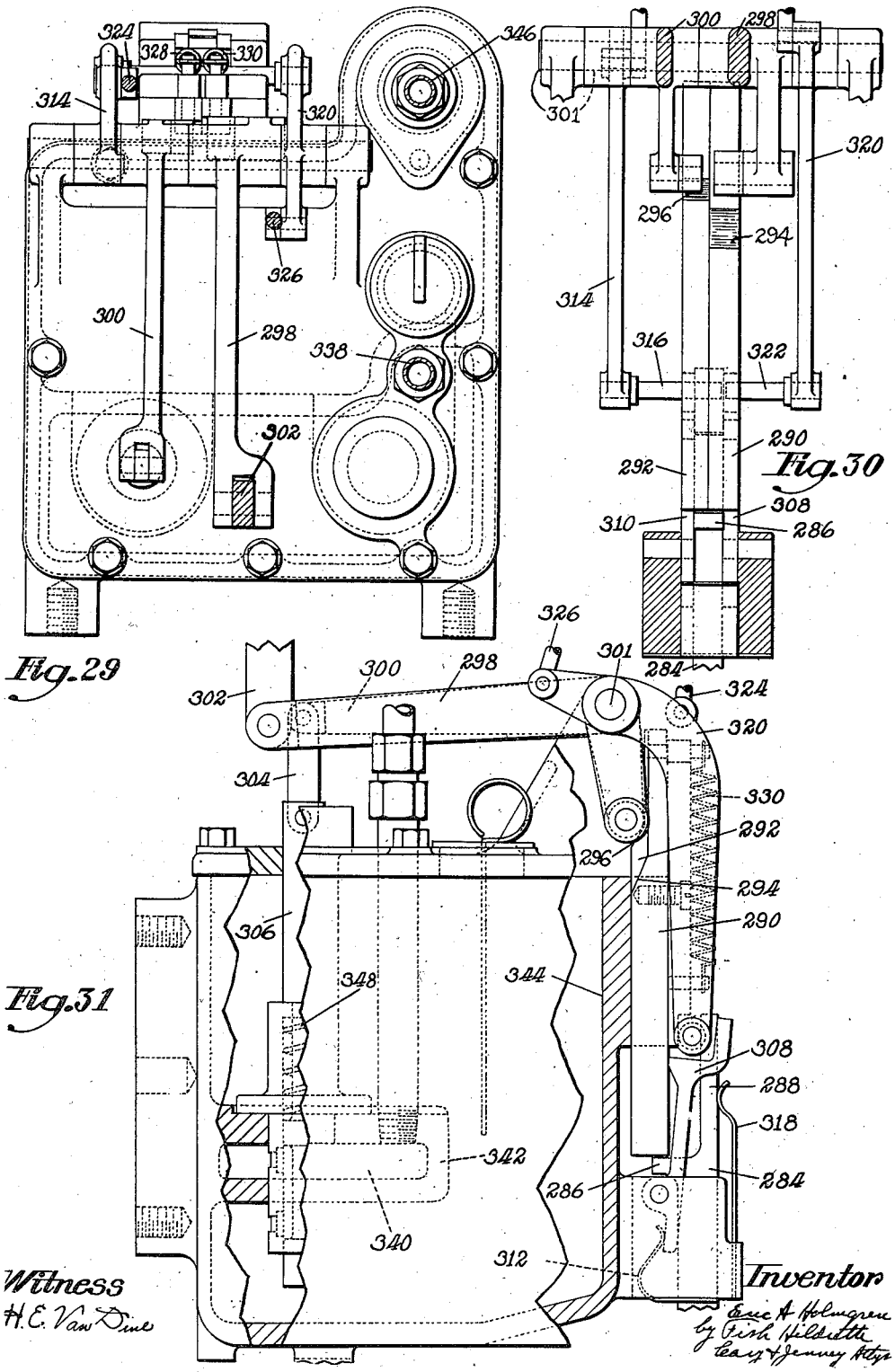

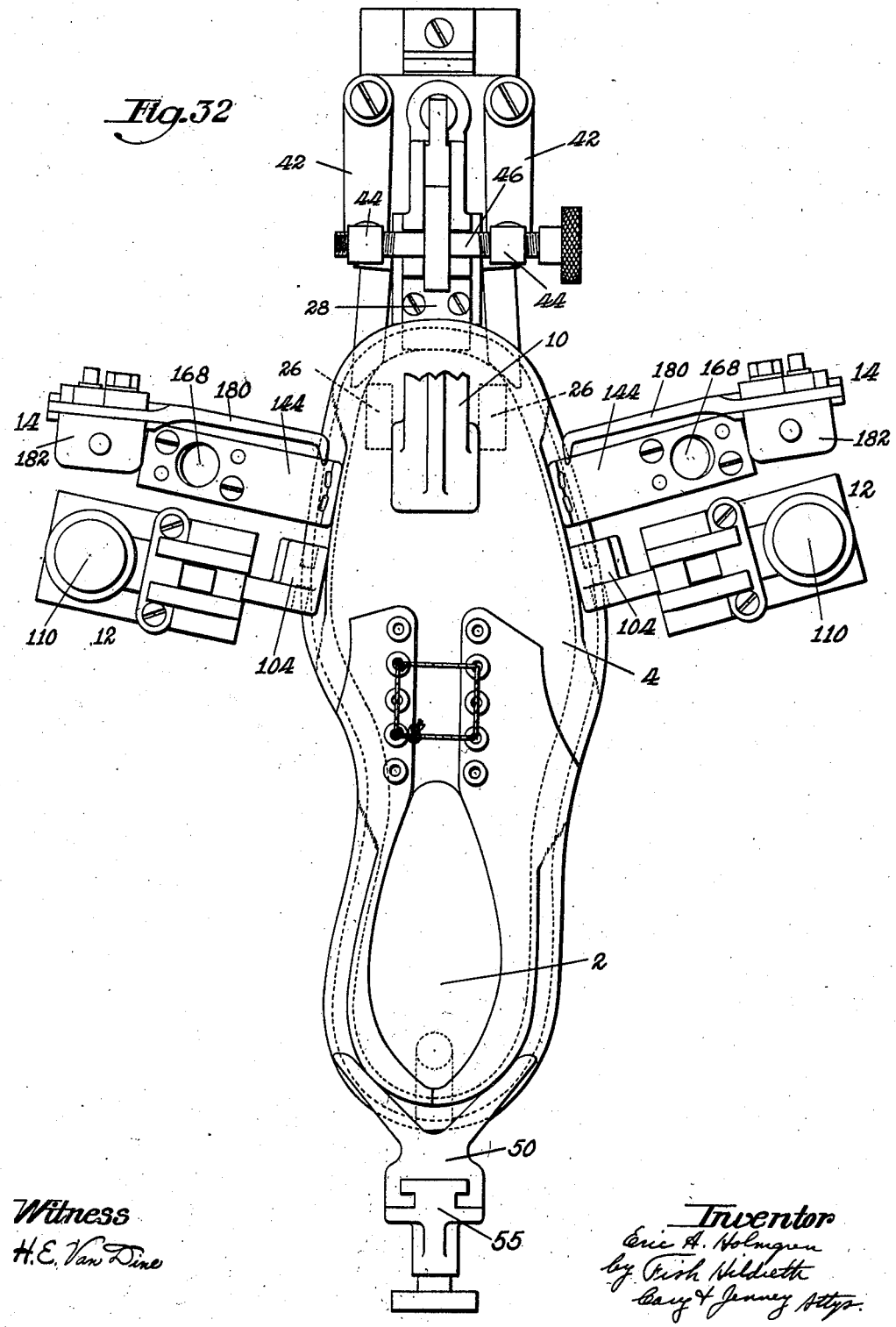

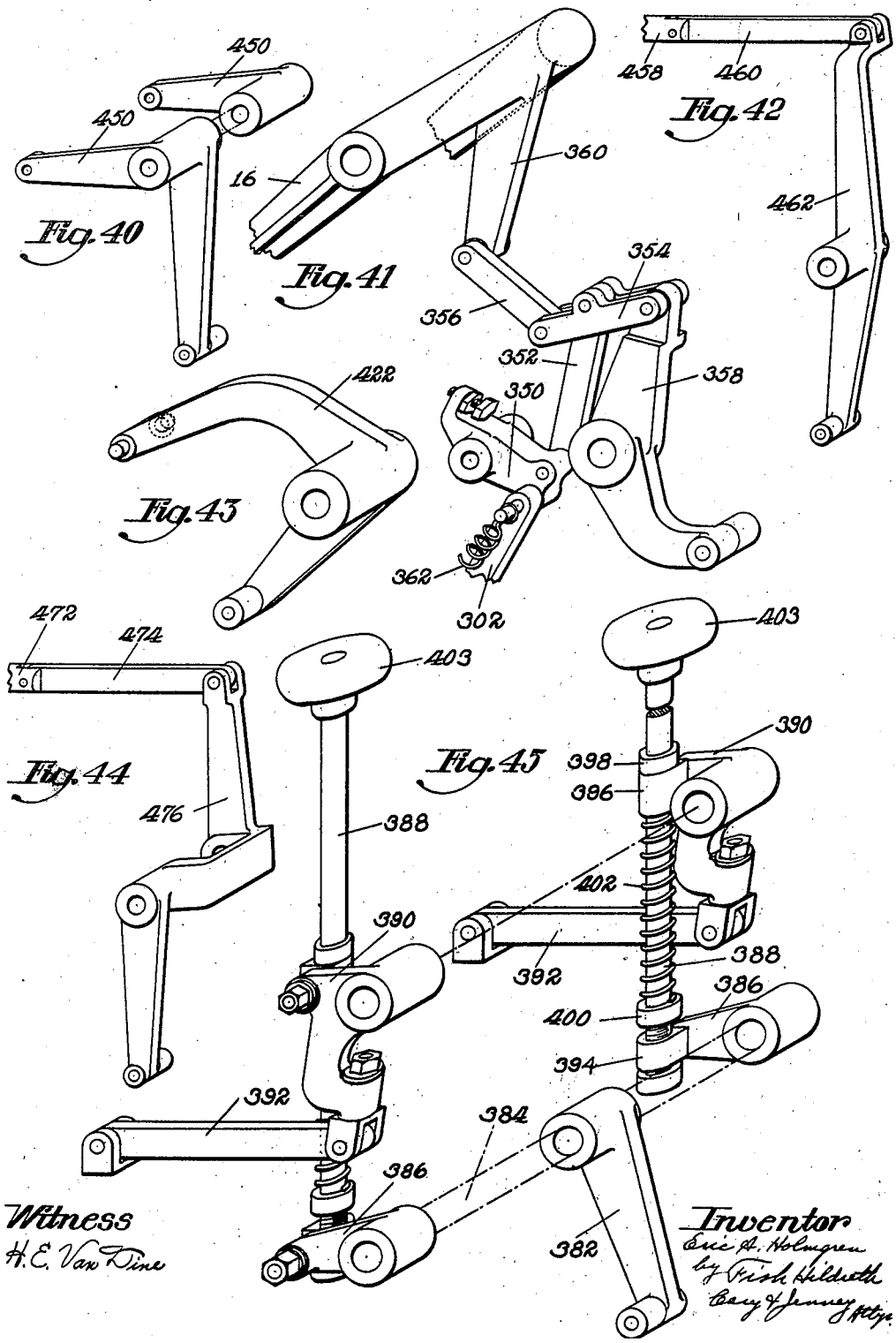

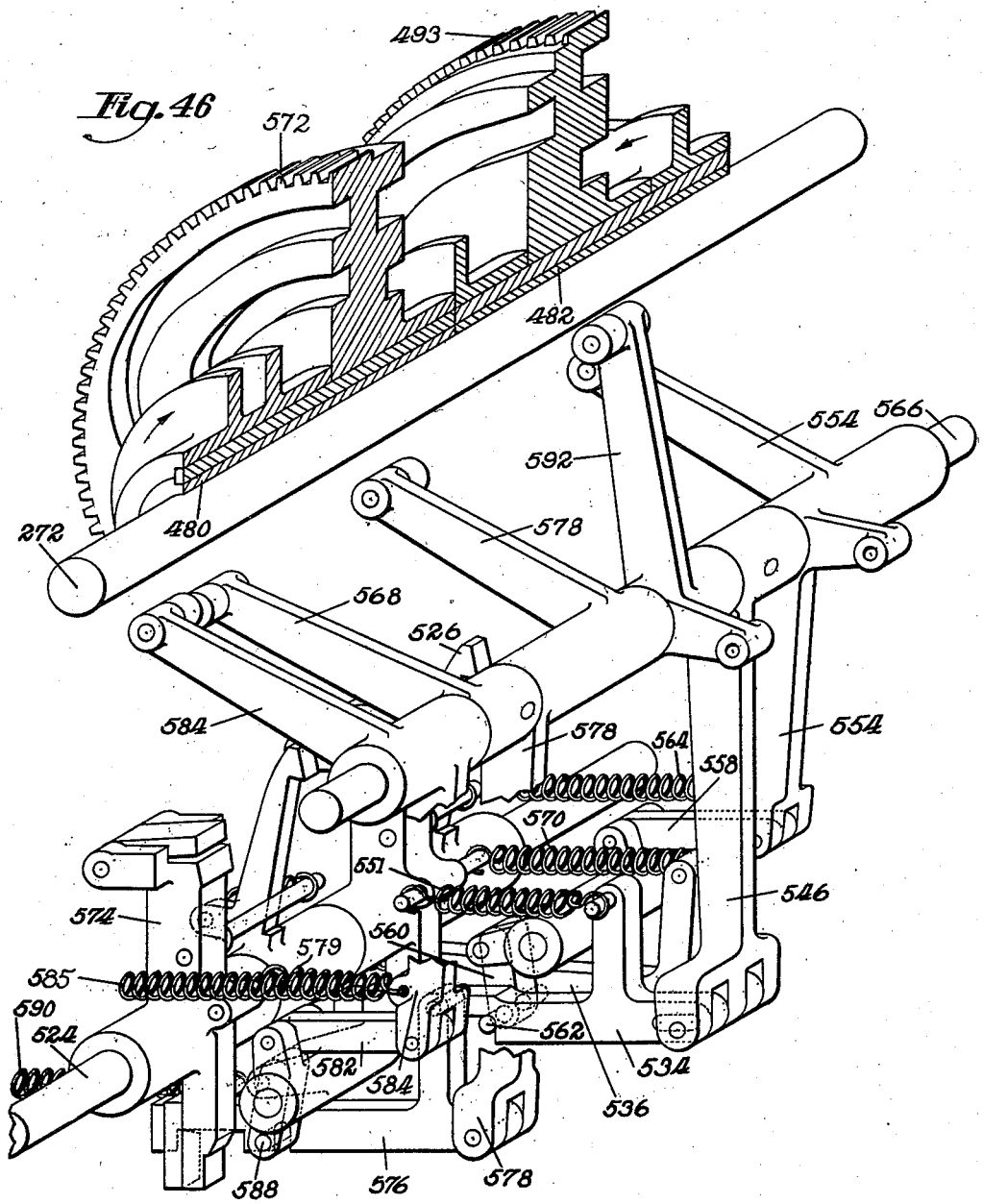

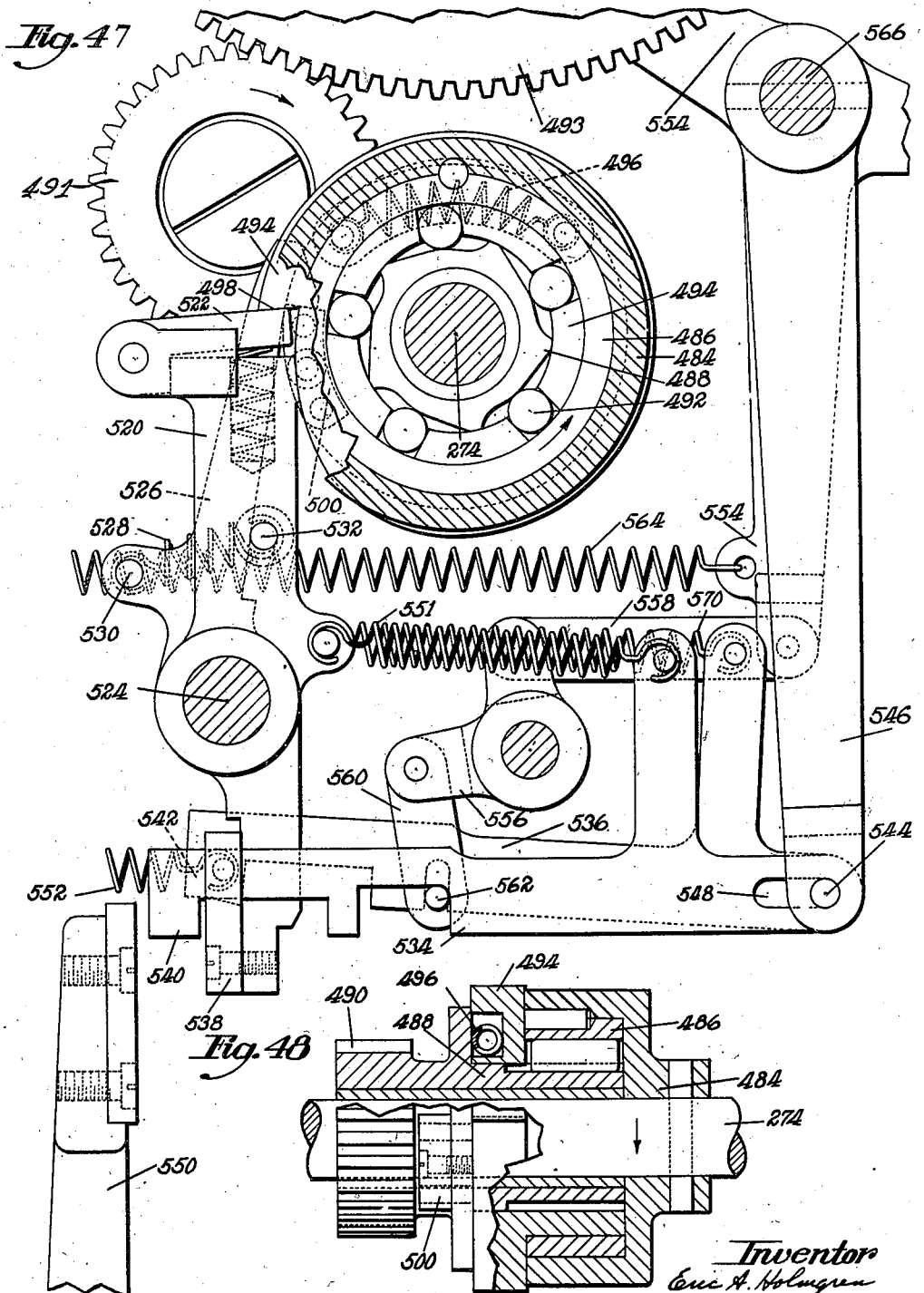

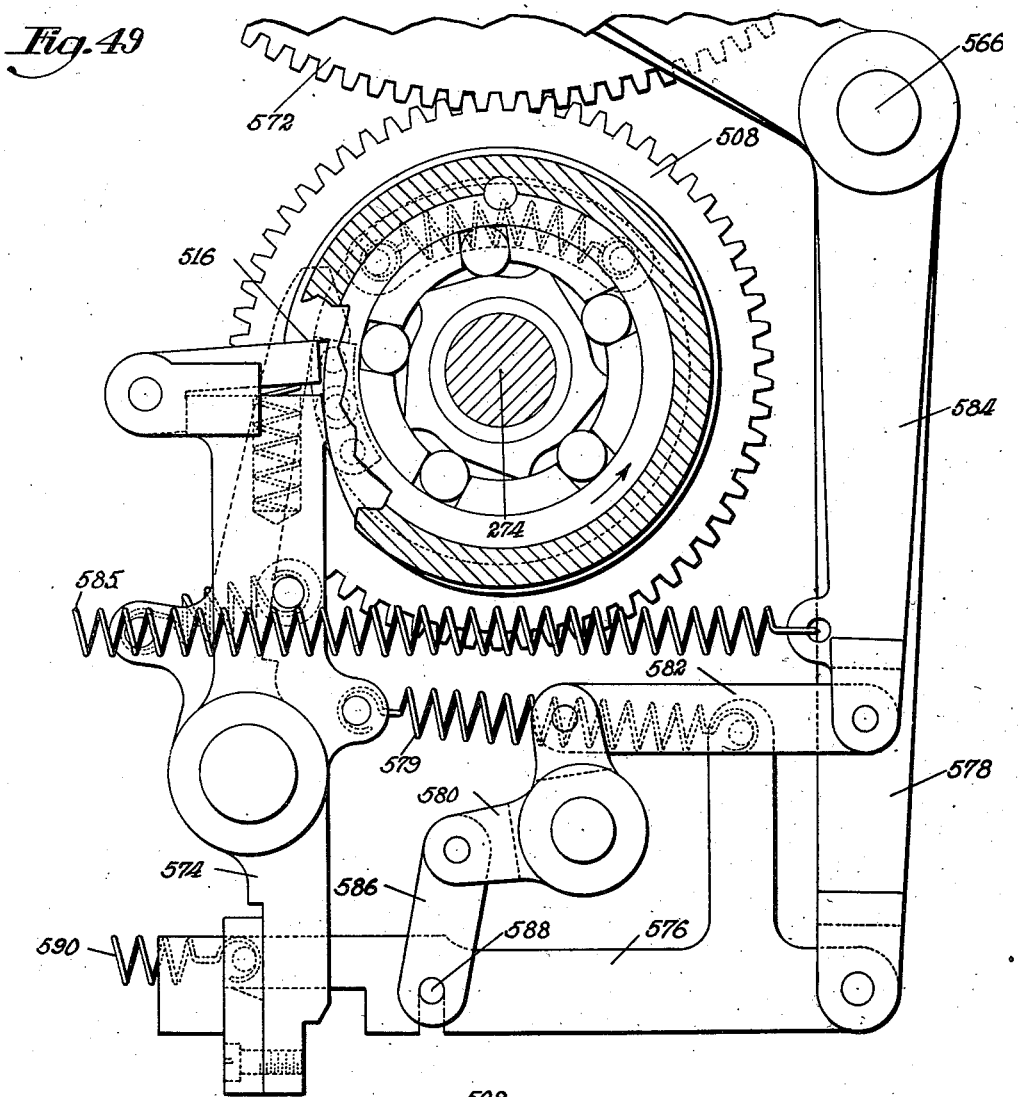
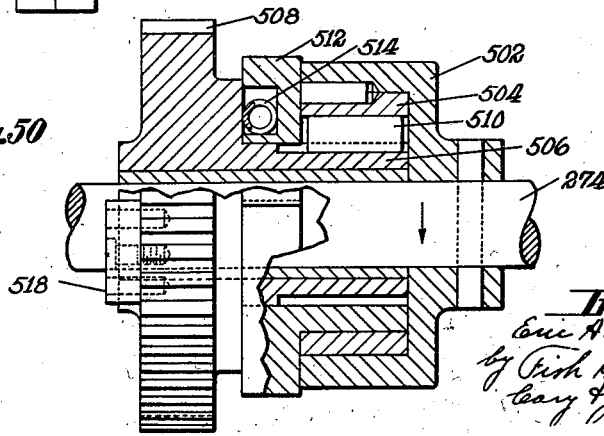

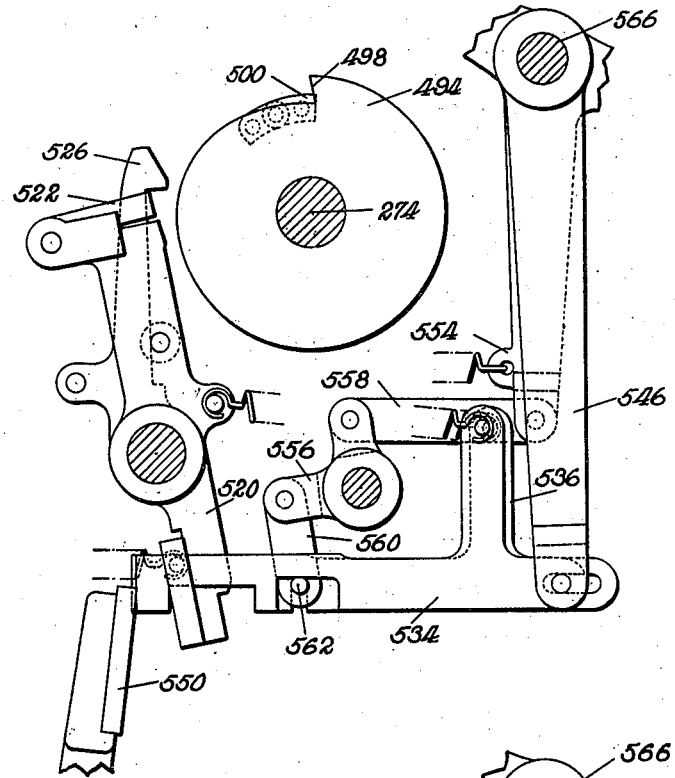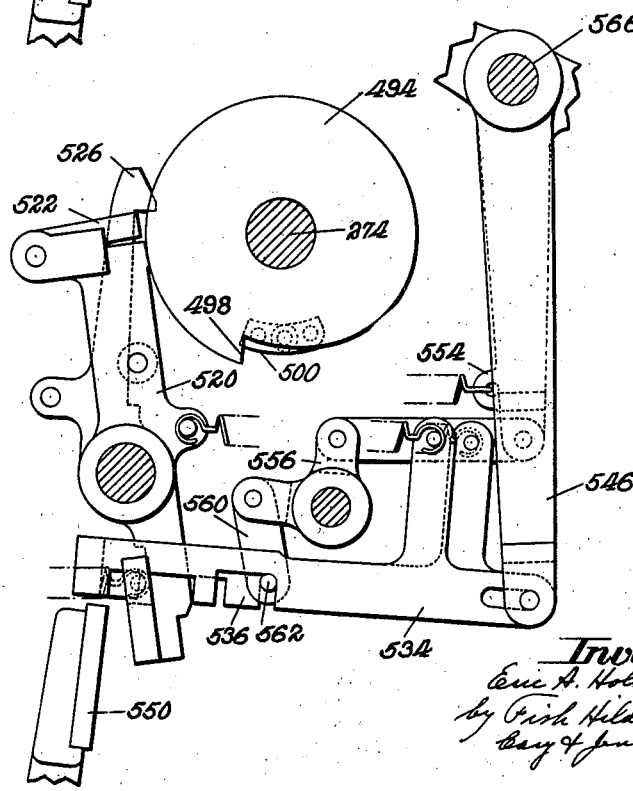

Jan. 26, 1943.　　　E. A. HOLMGREN　　　2,309,110
PULLING OVER MACHINE
Filed June 30, 1941　　　28 Sheets-Sheet 24

Inventor
Eric A. Holmgren
by Fish Hildreth
Cary & Jenney
Attys.

Jan. 26, 1943.  E. A. HOLMGREN  2,309,110
PULLING OVER MACHINE
Filed June 30, 1941  28 Sheets-Sheet 26
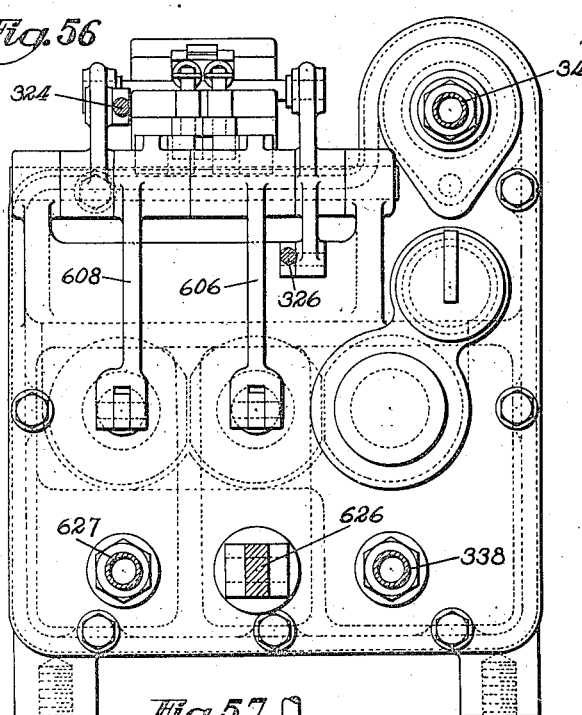
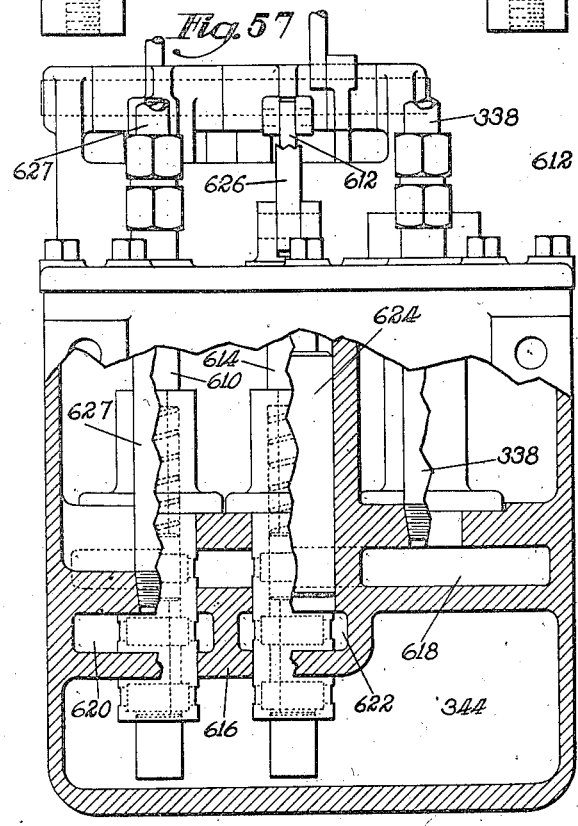
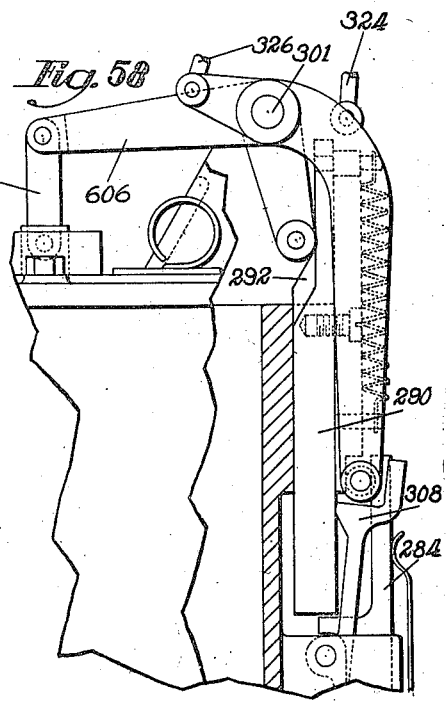
Inventor
Eric A. Holmgren
by Fish Hildreth
Cary & Jenney Attys.

Jan. 26, 1943.  E. A. HOLMGREN  2,309,110
PULLING OVER MACHINE
Filed June 30, 1941  28 Sheets-Sheet 28
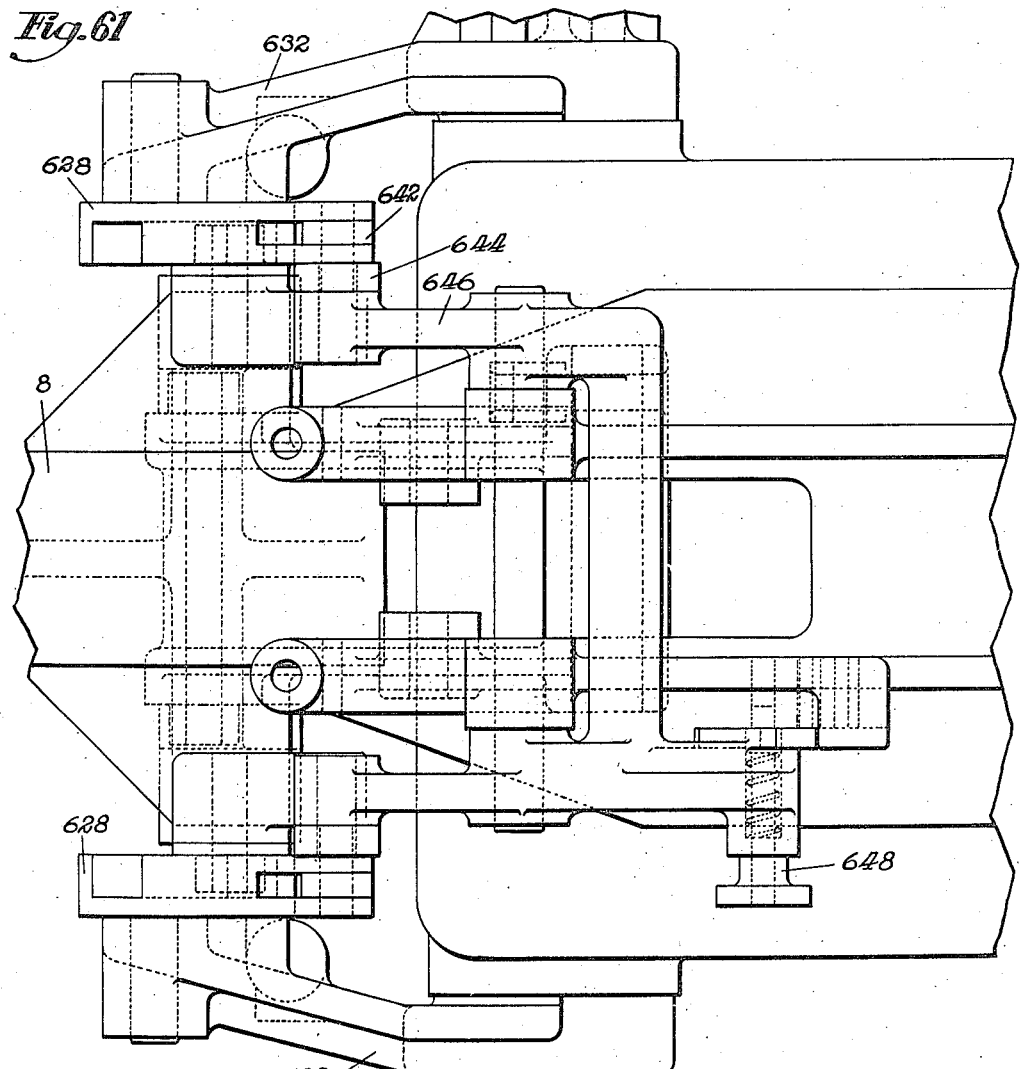
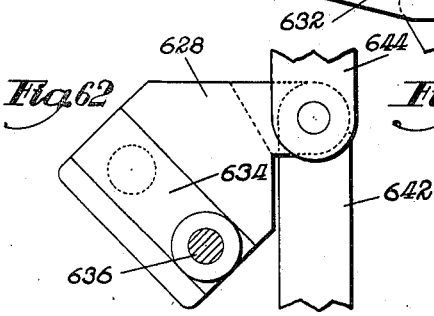
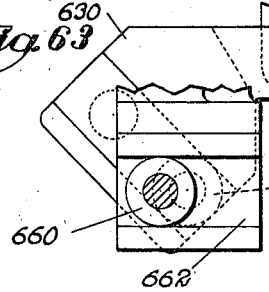
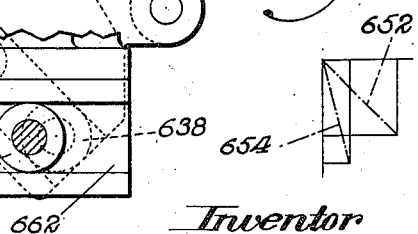
Witness
H. E. Van Dine
Inventor
Eric A. Holmgren
by Fish Hildreth
Cary & Jenney Attys Patented Jan. 26, 1943

2,309,110

UNITED STATES PATENT OFFICE 2,309,110

PULLING OVER MACHINE

Eric A. Holmgren, Beverly, Mass., assignor to United Shoe Machinery Corporation, Flemington, N. J., a corporation of New Jersey Application June 30, 1941, Serial No. 400,491

30 Claims. (Cl. 12—6)

The present invention relates to pulling over machines for use in the manufacture of stitchdown shoes and is herein disclosed as embodied in a machine for locating the upper of a stitchdown shoe in proper position with relation to a last and for pulling the upper tightly about the last and securing it to the projecting edge of a shoe sole previously placed on the last. The illustrated machine is intended primarily for use in the preparation of a stitchdown shoe for the subsequent operation of a stitchdown lasting machine, as for instance, a stitchdown sewing lasting machine of the type disclosed in the patent to Leveque No. 1,864,510, dated June 21, 1932. The illustrated machine, however, embodies novel features which are capable of use in machines for preparing stitchdown shoes for the operation of other types of machines or which can be used to advantage in machines which are not strictly pulling over machines, or in machines which are used in the manufacture of shoes other than stitchdown shoes.

The principal object of the present invention is to provide a pulling over machine particularly adapted for operation on stitchdown shoes having its various parts constructed and arranged to operate in an improved manner.

Other objects of the invention are to improve the construction and mode of operation of certain parts of a pulling over machine which are not necessarily limited to use in a pulling over machine or in a machine for operating on stitchdown shoes.

The machine hereinafter described as a specific embodiment of the several features of the present invention comprises a shoe support to receive a shoe last upon which has been placed a shoe upper and a shoe sole, the edges of which project beyond the sides of the last. At opposite sides of the shoe support in position to grasp the margins of the shoe upper at the forepart of the shoe, grippers are provided, and these grippers and the shoe support are mounted in the machine so as to be capable of a relative movement heightwise of the shoe in order to pull the upper over the last. Means are also provided for cooperating with the grippers to cause the margin of the upper to be outturned over the projecting shoe sole. In connection with the machine parts so far referred to, a feature of the present invention is embodied in a construction and arrangement of parts comprising fastener inserting devices and mechanism for actuating said devices to insert fasteners securing the outturned margins of the upper to the sole. In its broader aspects, this feature of the invention contemplates the provision of any suitable form of fastener inserting device. In the specific construction illustrated, these fastener inserting devices are constructed and arranged to insert fasteners in the form of thread stitches passing through and through the outturned margin of the upper and the sole.

A feature of the present invention is embodied in a novel construction and arrangement of the upper pulling grippers whereby they are utilized not only as a means for pulling the upper over the last, but also as a means for wiping the upper closely against the sides of the last. To this end, the grippers are constructed and arranged to hold the marginal portions of the upper outturned away from the last during their pulling action and to bear at their inner ends against the upper and press the upper tightly against the sides of the last during the relative heightwise movement of the grippers and shoe support.

Another feature of the present invention is embodied in a novel and improved construction and arrangement of wiper plates cooperating with the upper pulling grippers to wipe the upper closely to the sides of the last and to press the outturned margins of the upper against the shoe sole. In accordance with this feature of the invention, wiper plates are provided which act at one side of the upper pulling grippers lengthwise of the shoe and a relative movement heightwise of the shoe is imparted to these wiper plates and the shoe support. In the illustrated embodiment of the invention, a wiper plate and an upper pulling gripper is provided on each side of the shoe support and the wiper plate and gripper are mounted upon the same carrier. Also in the illustrated embodiment of the invention, the relative movement of the shoe support and upper pulling grippers and wiper plates is produced by a movement of the shoe support with relation to the grippers and wiper plates which, during this movement of the shoe support, remain practically stationary.

Other features of the invention comprise a construction and arrangement of parts whereby each of the wiper plates acts as a table or work support against which the outturned upper and sole are clamped while the fasteners are being inserted, a construction and arrangement of parts whereby each of the wiper plates acts as a table or work support to resist the thrust of the fastener inserting devices and in the specific construction illustrated as a work supporting table through which the needle of the thread fastening devices passes.

Other features of the invention are embodied in a construction and arrangements of parts whereby the upper pulling grippers and fastener inserting devices are supported on carriers at each side of the work support and whereby these carriers are adjusted to adapt the grippers and fastener inserting devices for operation on shoes of different styles and sizes and whereby they are operated during the upper pulling and securing operations to cause the grippers and fastener inserting devices to operate efficiently and in proper timed relation.

In addition to the features of invention above referred to, the machine hereinafter specifically described embodies novel features of construction and arrangement of parts hereinafter described and claimed.

Figure 2:
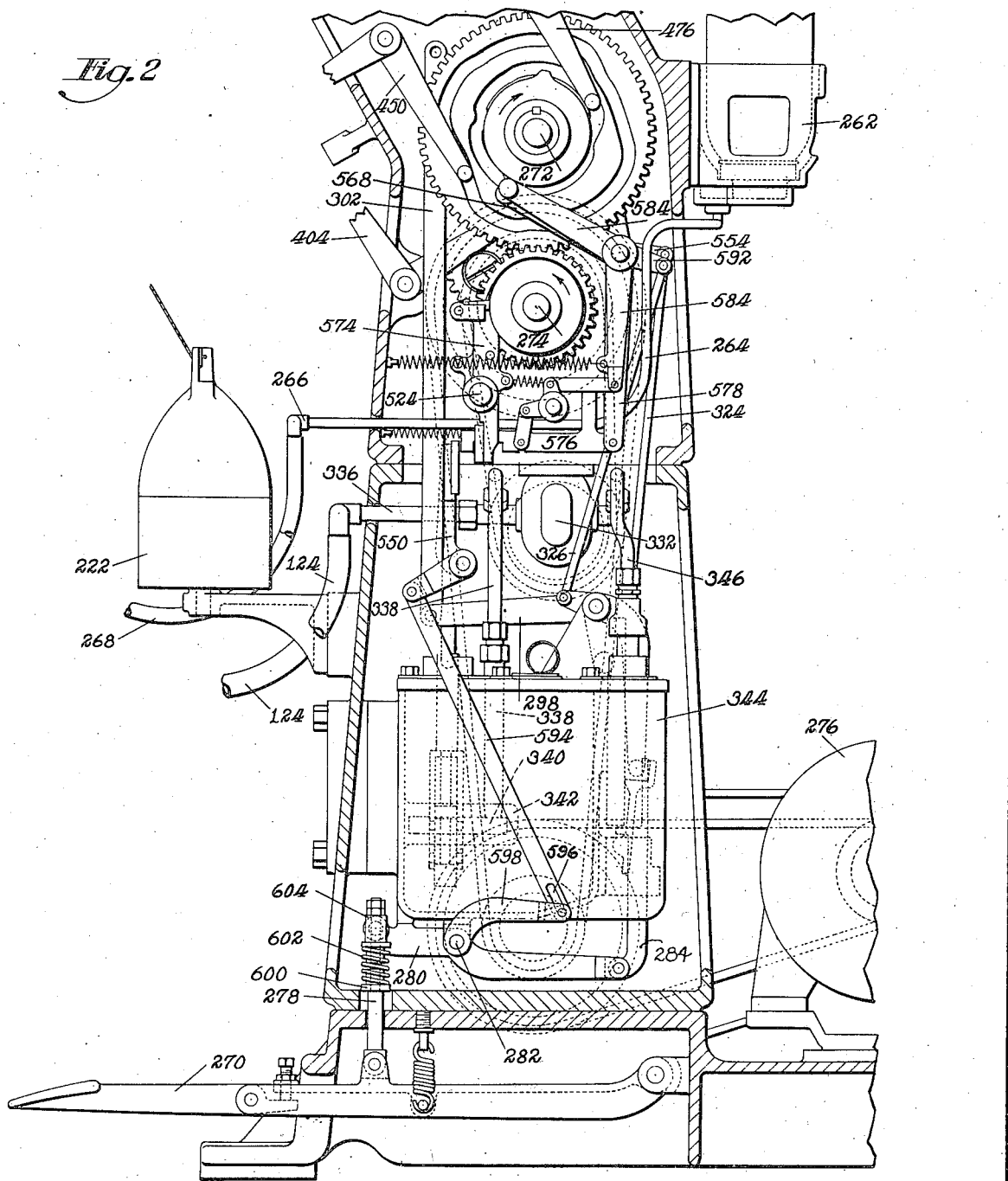
Figures 3, 4:
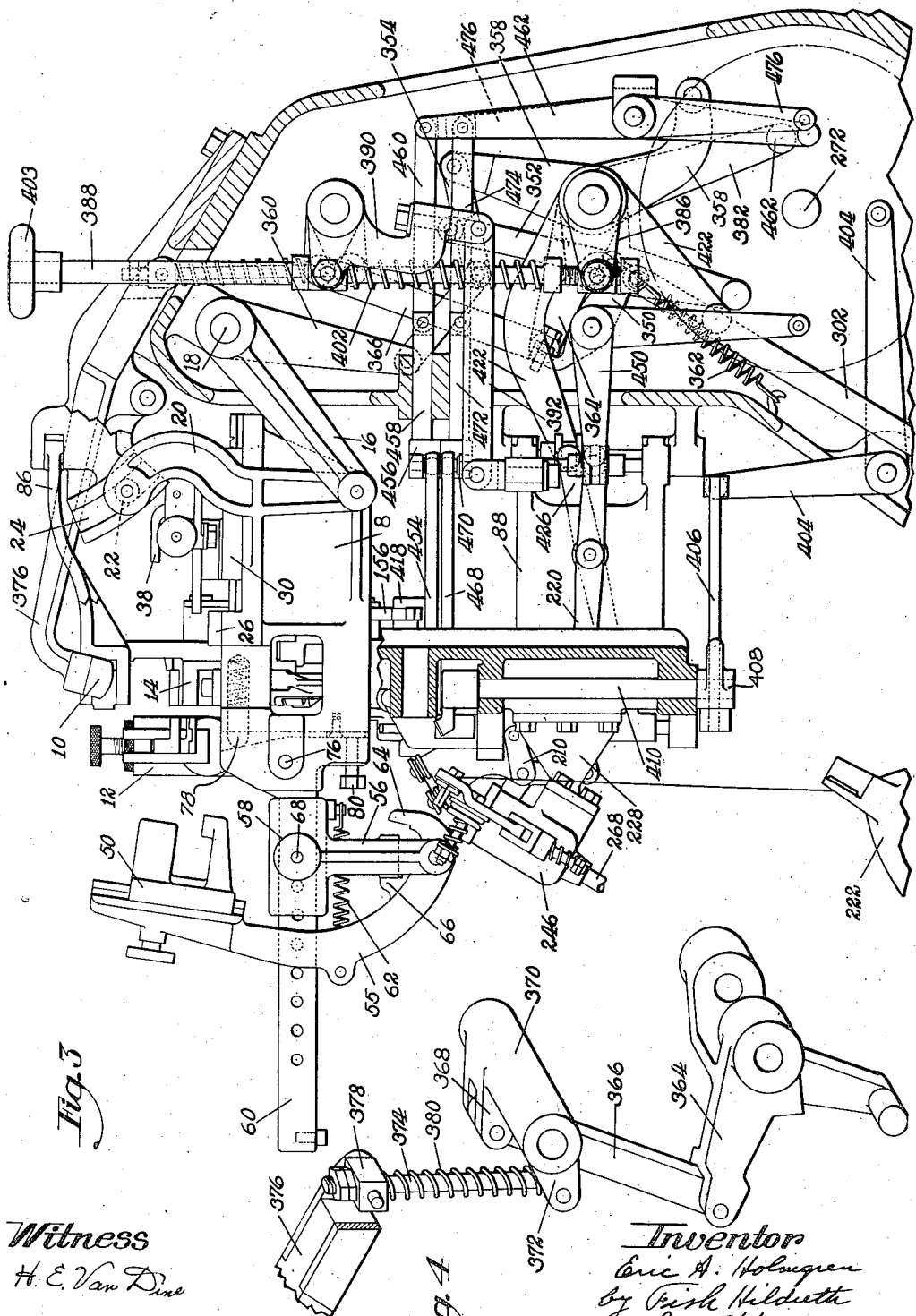
Figure 5:
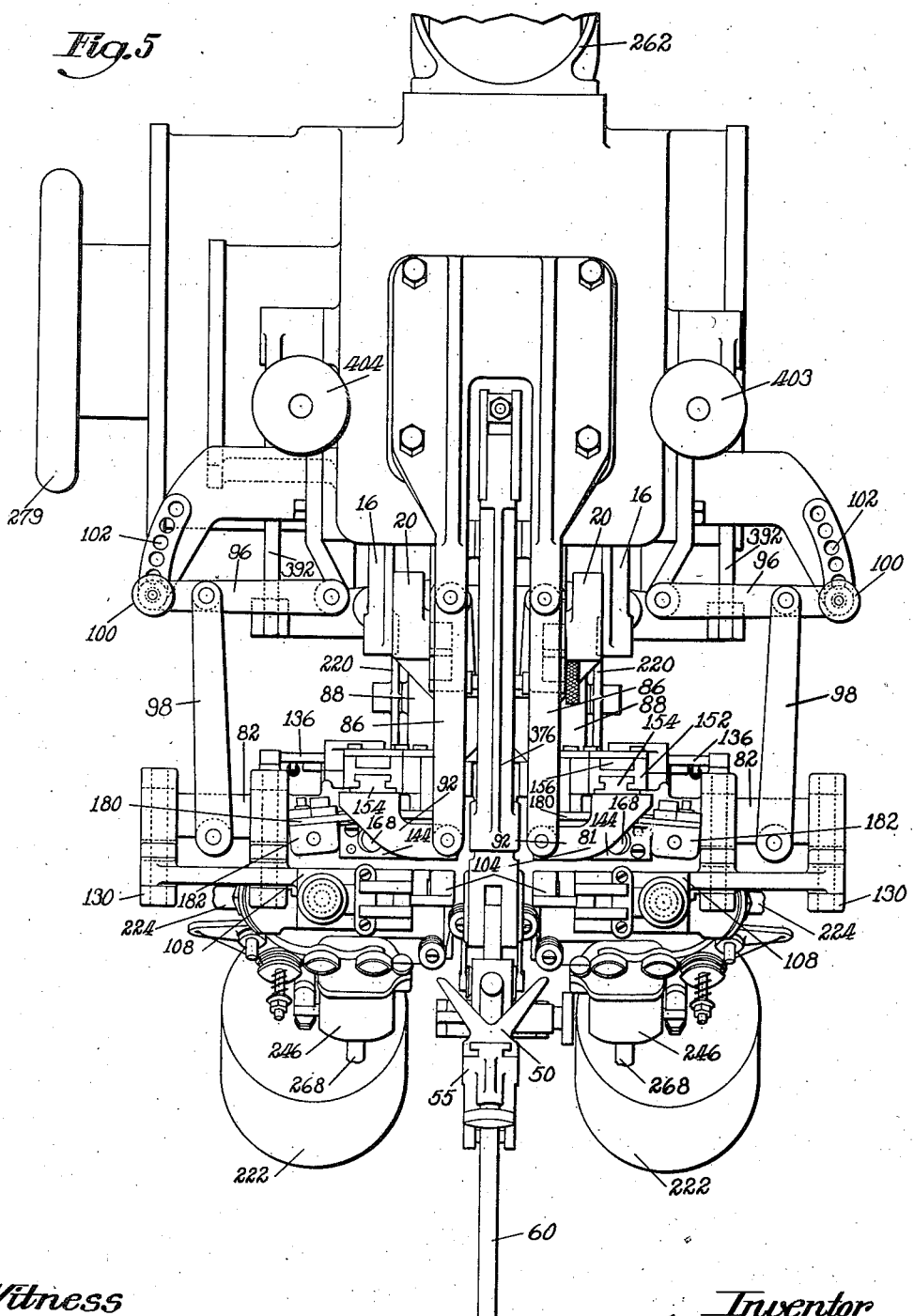
Figure 6:
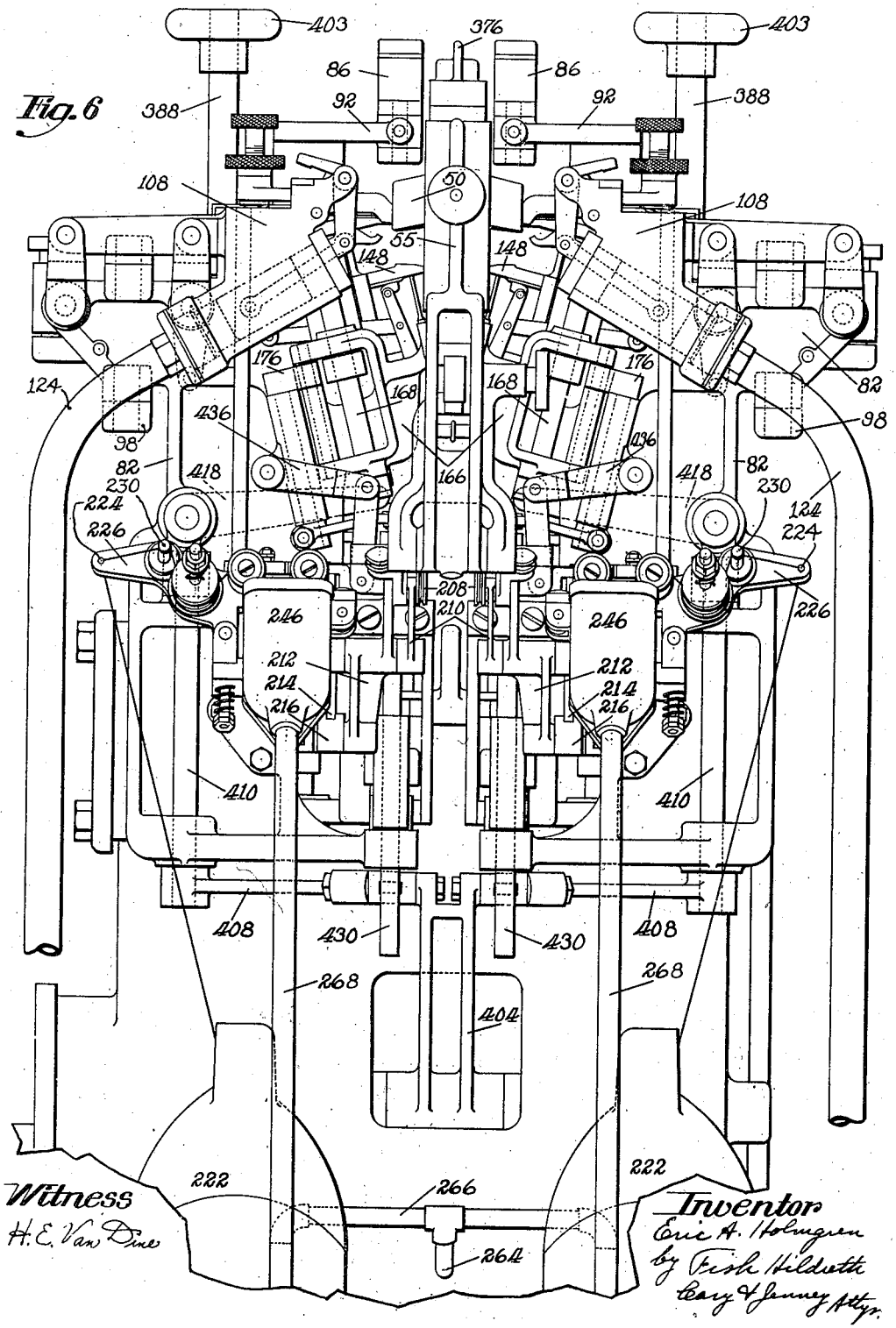
Figure 7:
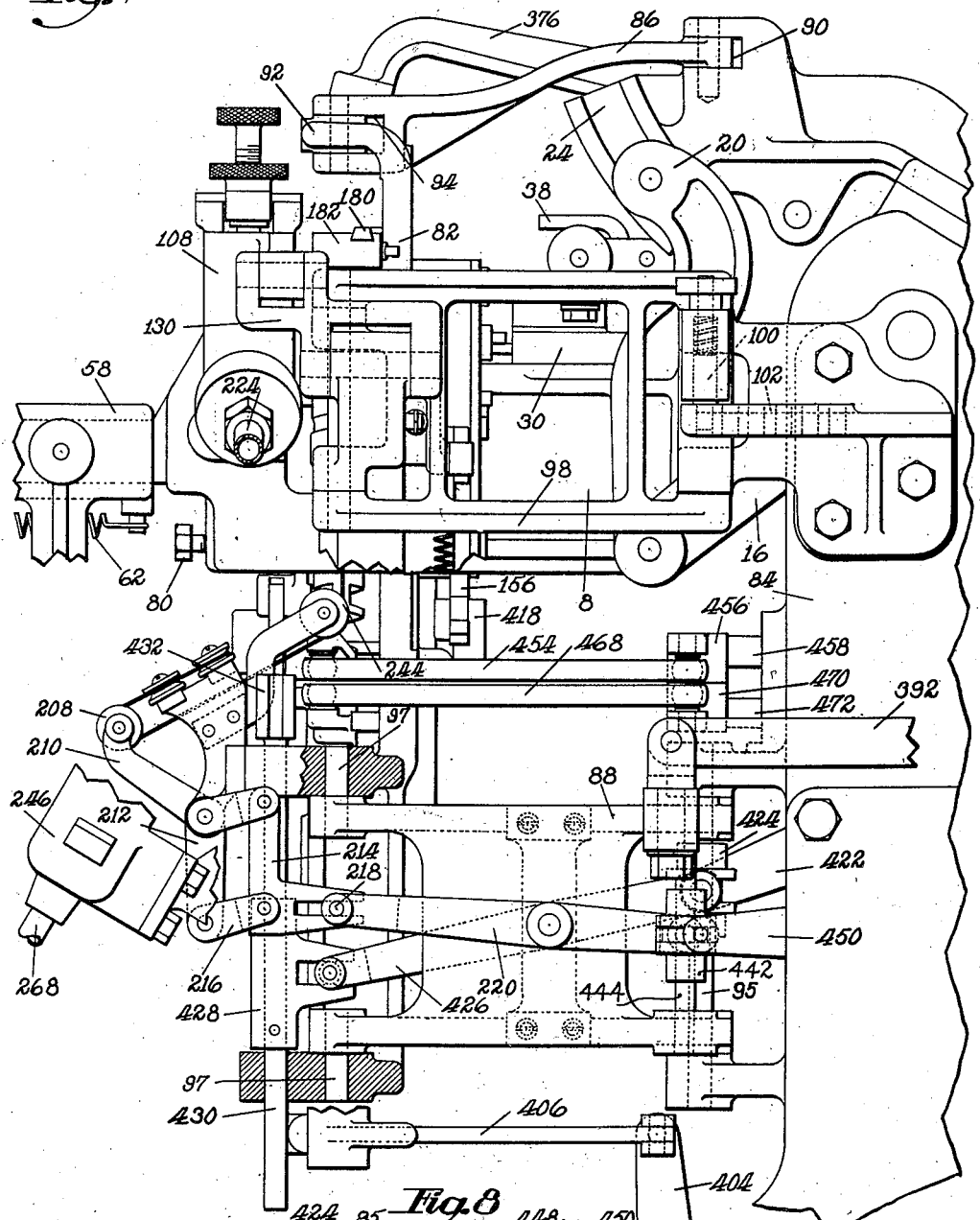
Figure 8:
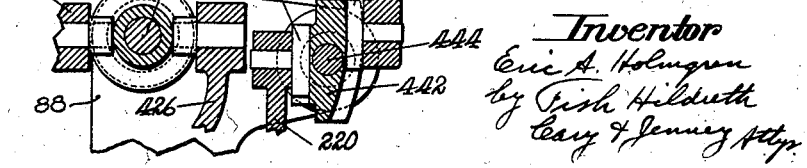
Figure 14:
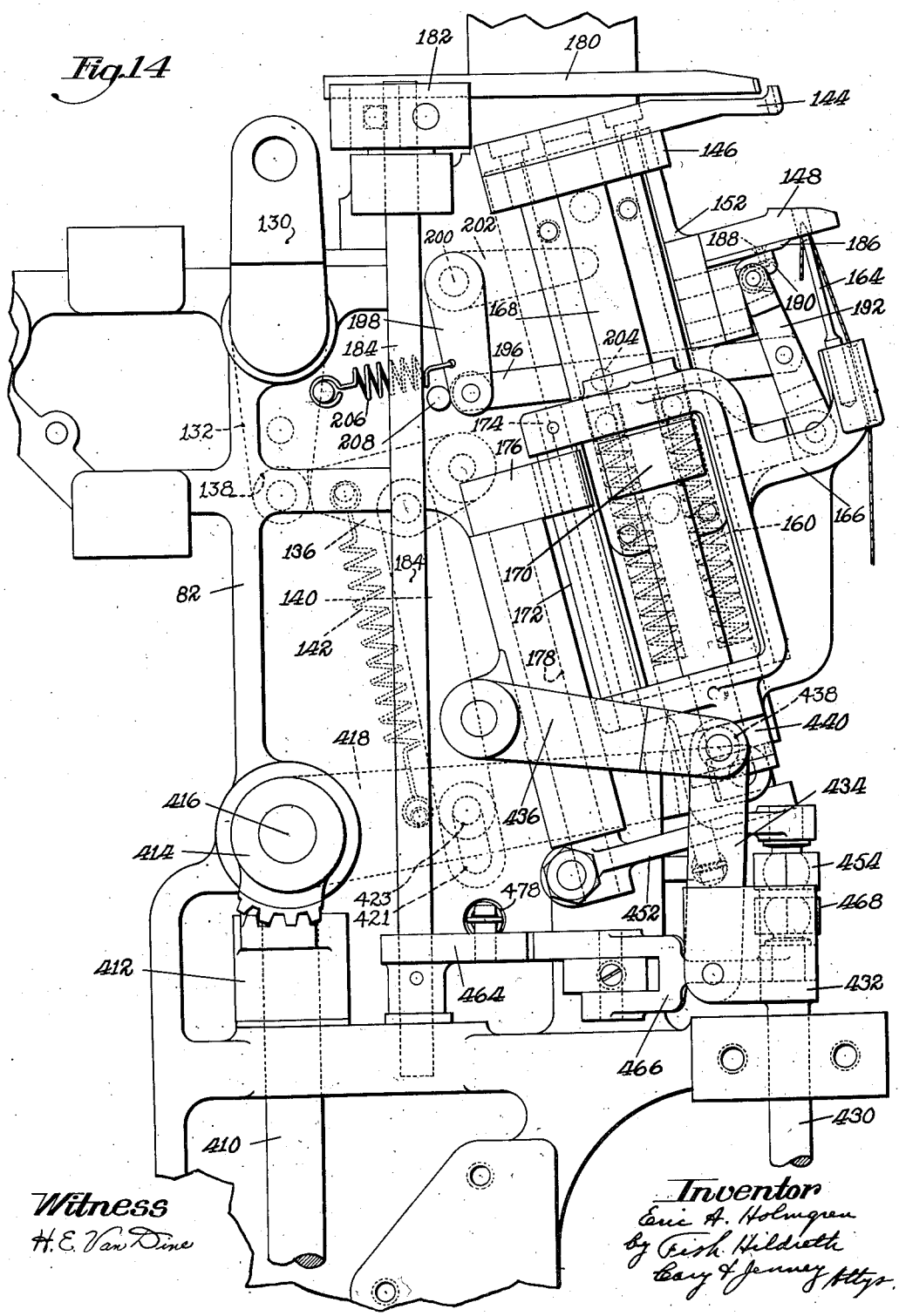
Figure 15:
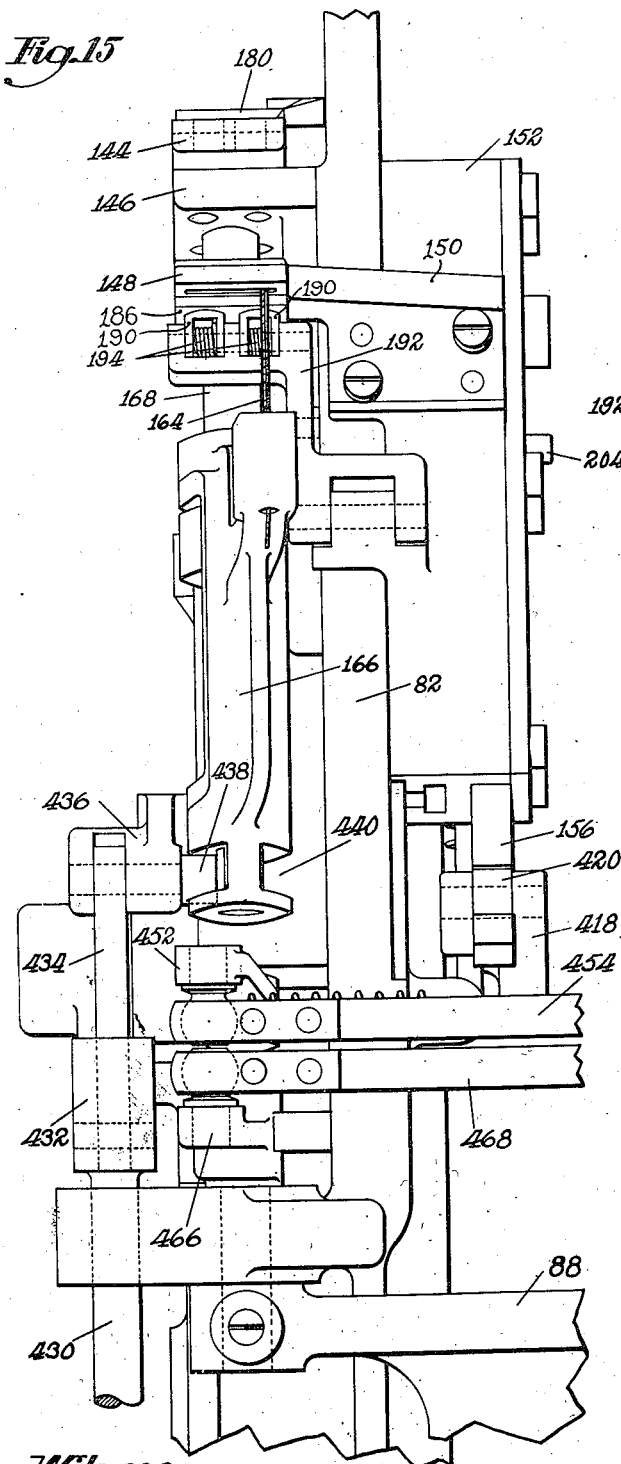
Figure 16:
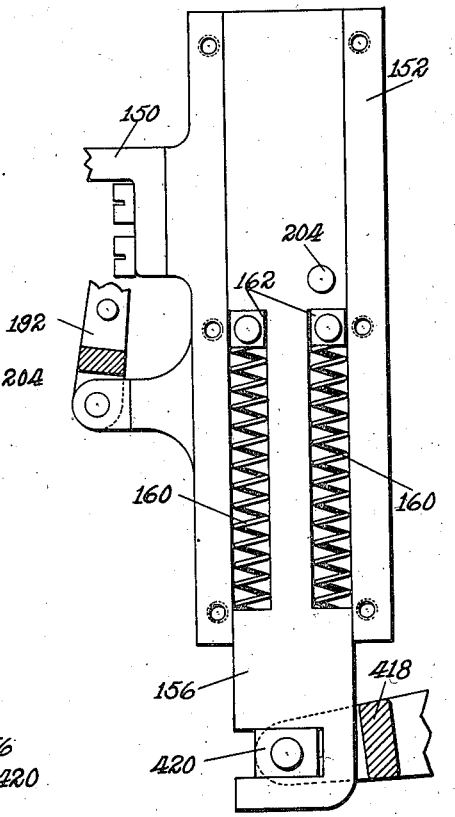
Figure 17:
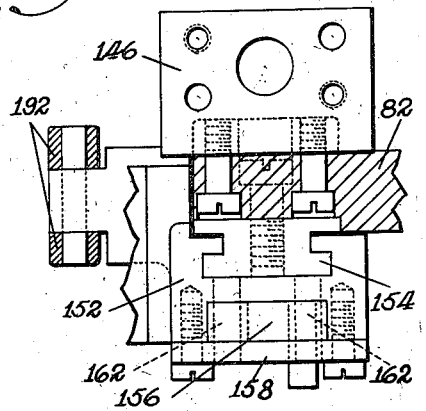
Figure 22:
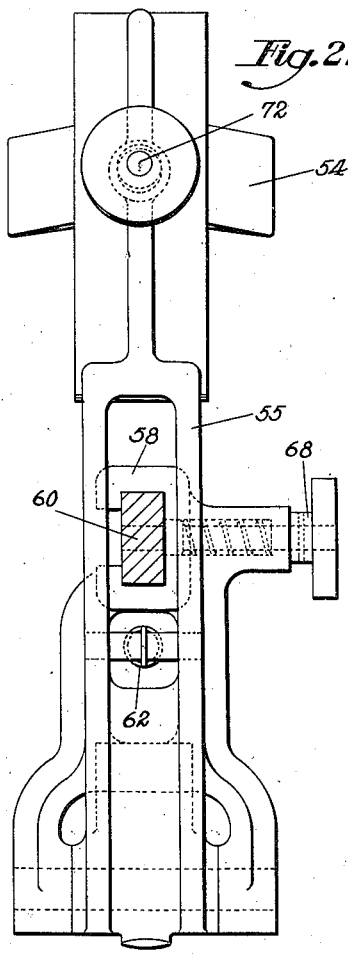
Figure 23:
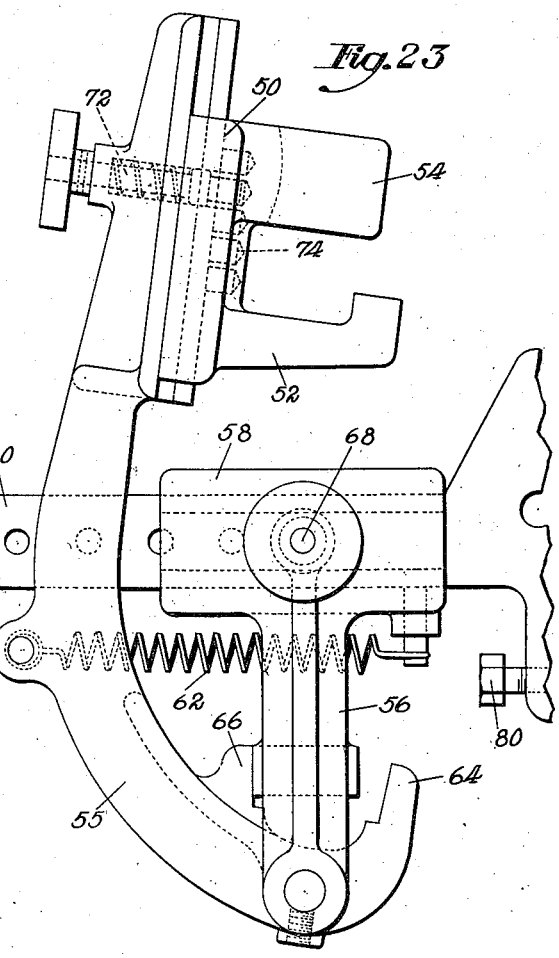
Figure 24:
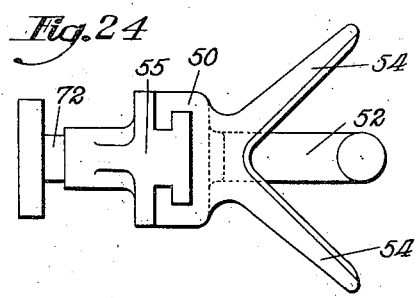
Figure 25:
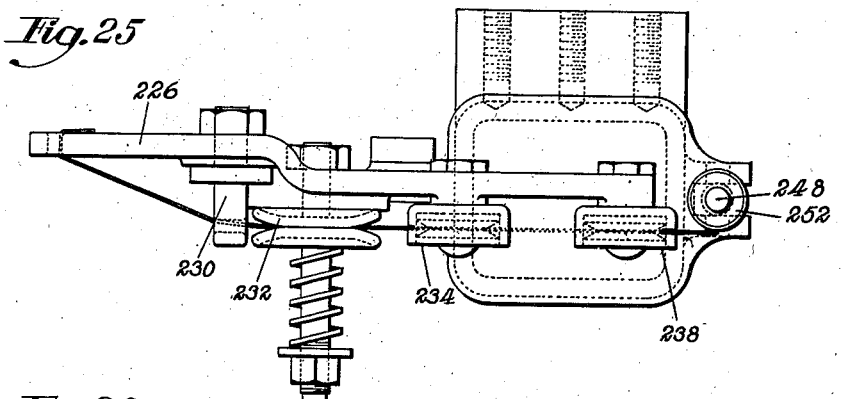
Figure 26:
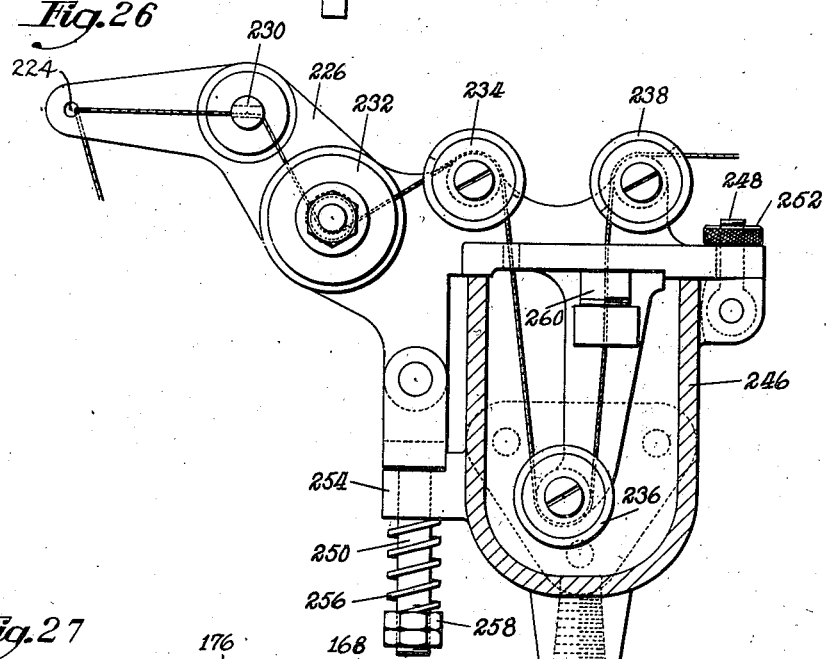
Figure 27:
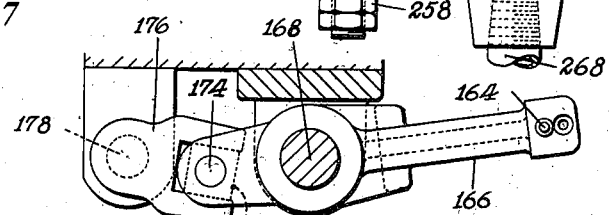
Figure 28:
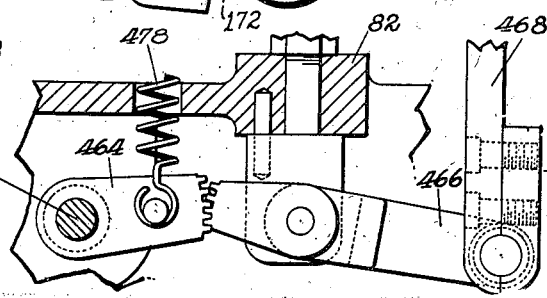
Figure 33:
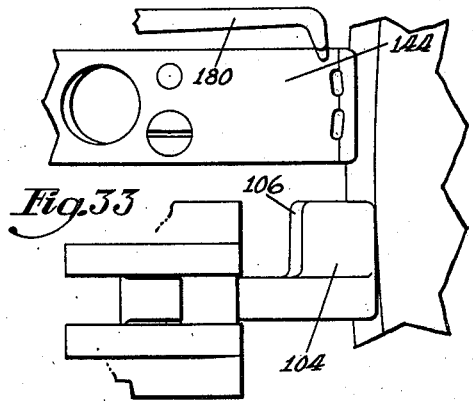
Figure 34:
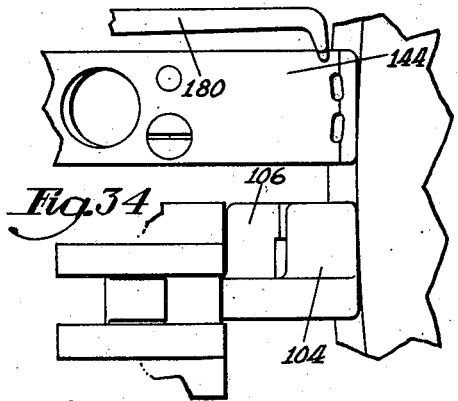
Figure 35:
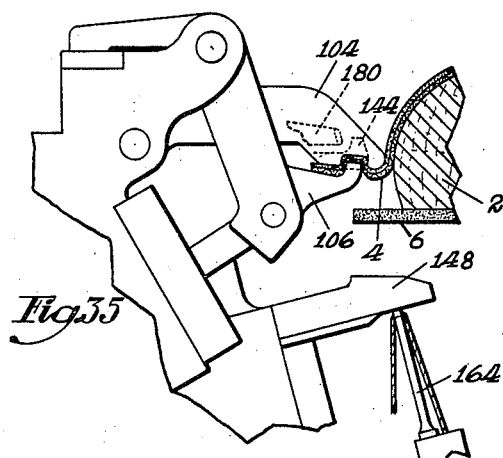
Figure 36:
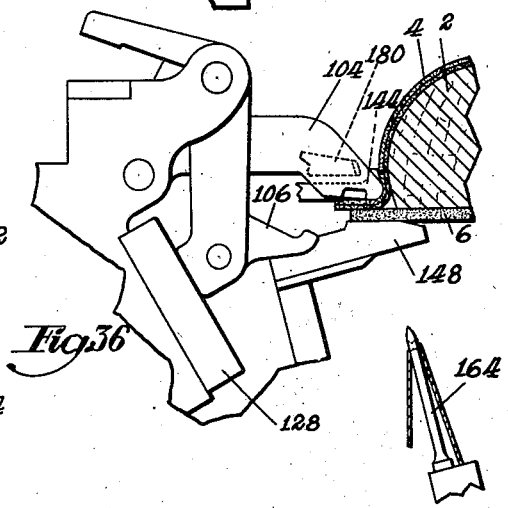
Figure 37:
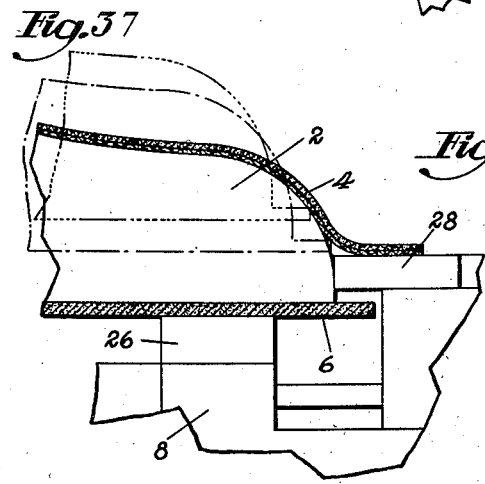
Figure 38:
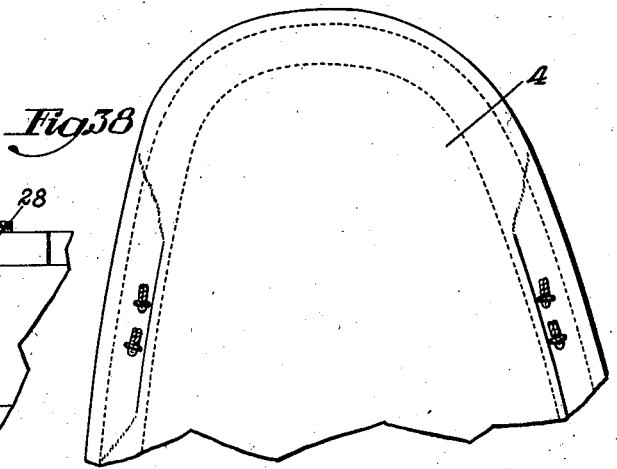
Figure 39:
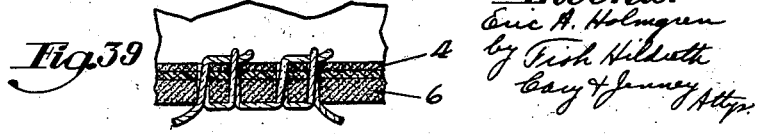
Figure 53:
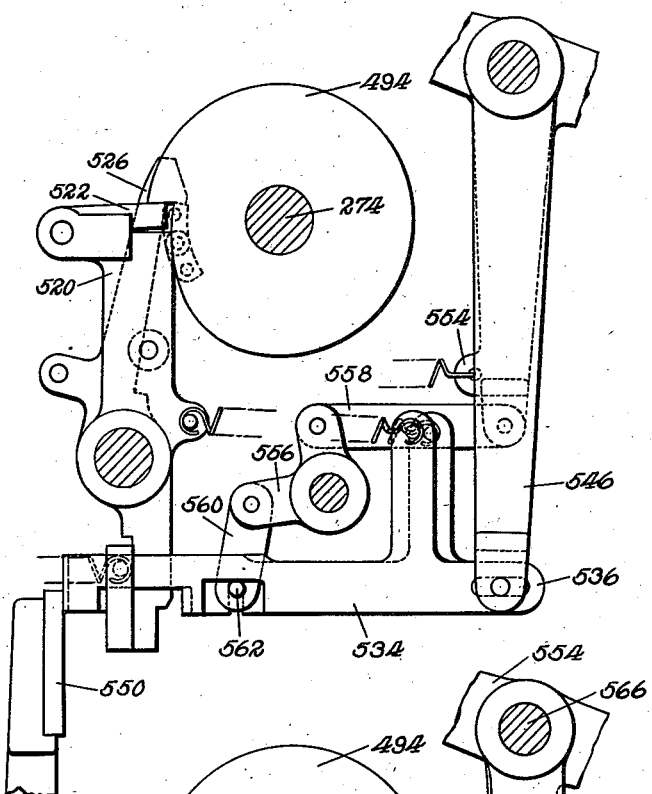
Figure 54:
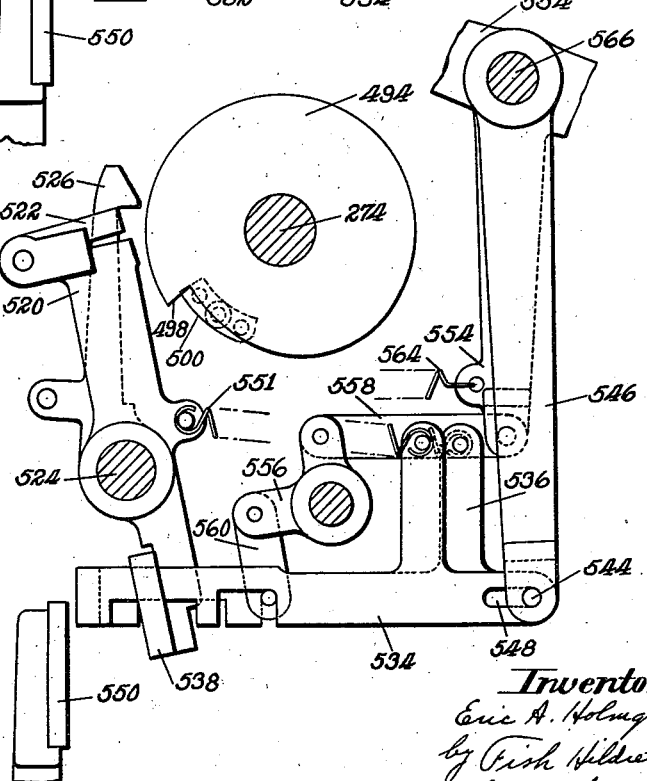
Figure 55:
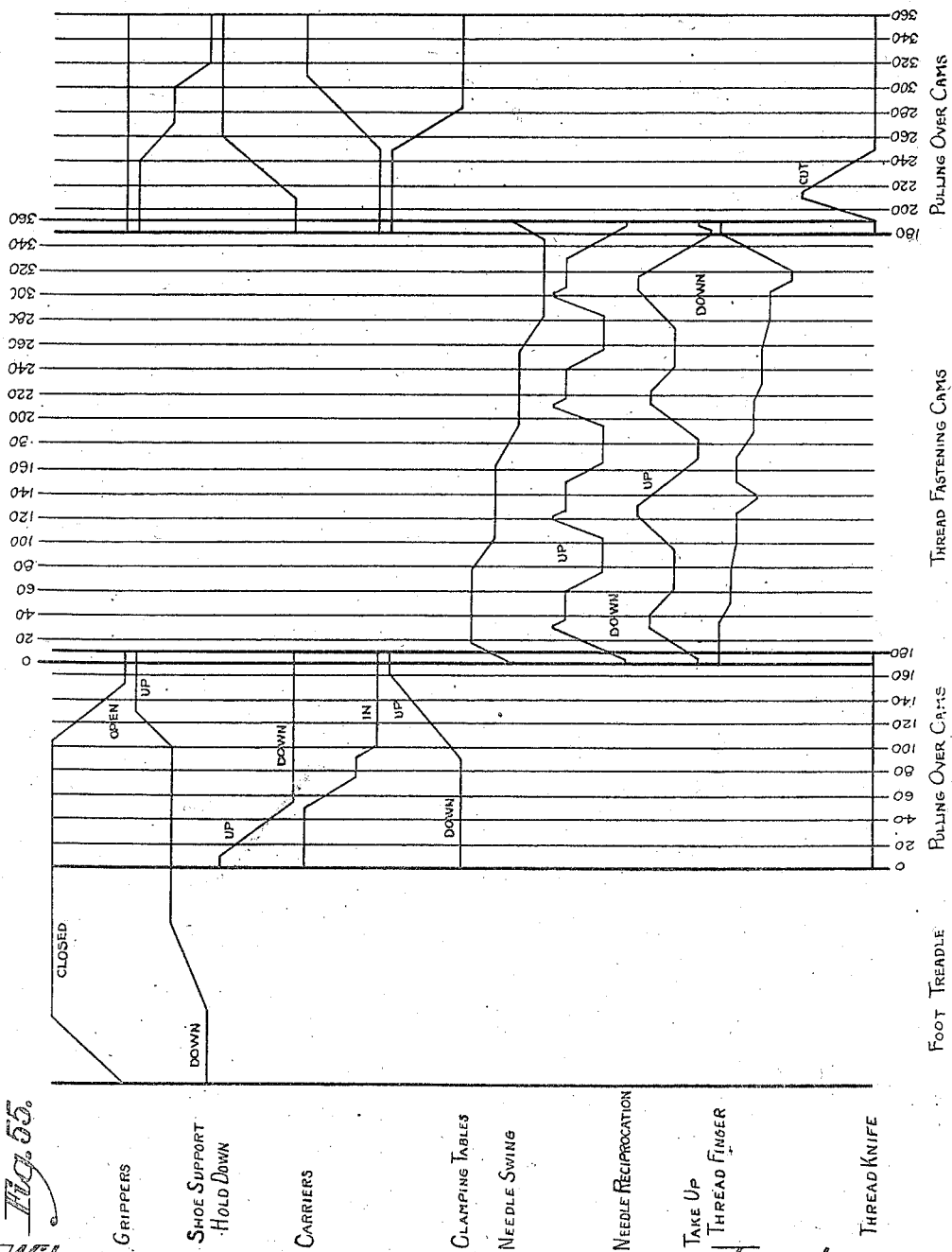
Figure 59:
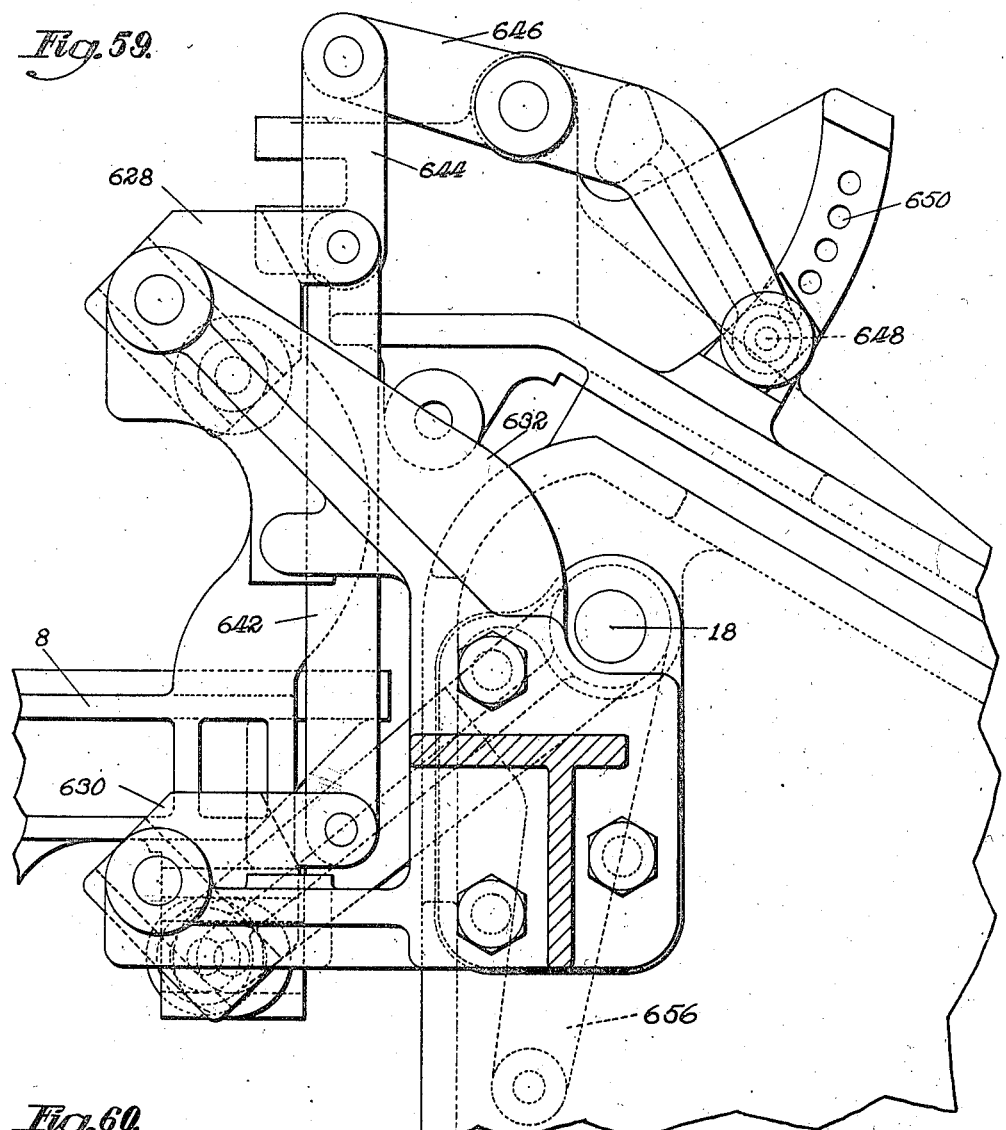
Figure 60:
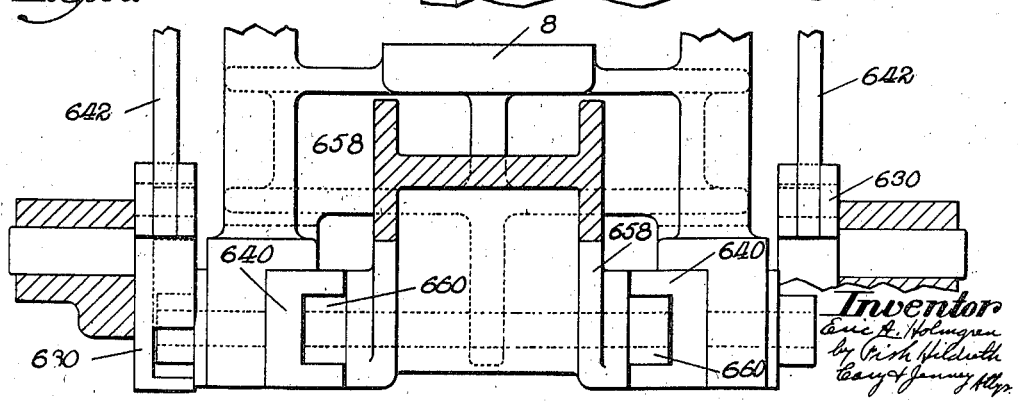

Referring to the drawings, Fig. 1 is a view in side elevation of a pulling over machine for use in the manufacture of stitchdown shoes embodying the several features of the invention; Fig. 2 is a view in side elevation of the lower part of the machine illustrated in Fig. 1 on a somewhat larger scale, and with the enclosing frame of the machine broken away to show underlying parts; Fig. 3 is a view in side elevation, partly in section, of the upper part of the machine shown in Fig. 1, also on a somewhat enlarged scale; Fig. 4 is a detail perspective view of the portion of the mechanism which actuates the holddown for a shoe placed in the machine; Fig. 5 is a plan view of the upper portion of the machine; Fig. 6 is a view in front elevation of the upper part of the machine, as illustrated in Fig. 5; Fig. 7 is a view in side elevation, partly in section, of a portion of the upper part of the machine illustrated in Fig. 3, but on a still larger scale; Fig. 8 is a detail sectional plan view illustrating some of the connections through which the take-up and needle are actuated; Fig. 9 is a view showing in sectional elevation the driving clutches and the cam shafts of the machine, the mechanism being shown as viewed from the front of the machine; Fig. 10 is a view showing in sectional elevation the cam shaft of the machine and the parts at the upper portion of the machine, as viewed from the rear of the machine; Fig. 11 is a detail plan view, partly in section, illustrating particularly the carriers upon which the upper pulling grippers and fastener inserting devices are mounted; Fig. 12 is a detail vertical sectional view illustrating particularly the mechanism at the upper portion of Fig. 11; Fig. 13 is a detail view illustrating particularly one of the adjustable brackets and links through which the carriers for the upper pulling grippers and fastener inserting devices are manually adjustable; Fig. 14 is a detail view looking from the front of the machine of the thread fastener inserting devices and their actuating connections; Fig. 15 is a view of the parts illustrated in Fig. 14 looking from the right of Fig. 14; Fig. 16 is a detail view looking from the right of Fig. 15 of a portion of the connections for actuating the work clamping table of the thread fastener inserting devices; Fig. 17 is a detail plan view, partly in section, of the parts illustrated in Fig. 15; Fig. 18 is a detail plan view illustrating particularly one of the upper pulling grippers; Fig. 19 is a view in front elevation of the mechanism illustrated in Fig. 18; Fig. 20 is a detail plan view of a portion of the shoe support illustrating particularly the adjustable gage for the toe portion of the shoe; Fig. 21 is a view in side elevation of the parts illustrated in Fig. 20; Fig. 22 is a front view, partly in section, of the heel supporting portion of the shoe support; Fig. 23 is a view in side elevation of the parts illustrated in Fig. 22; Fig. 24 is a detail plan view illustrating particularly the gage and support for the heel portion of the shoe; Fig. 25 is a detail plan view of one of the thread tension and lubricating devices; Fig. 26 is a view in front elevation, partly in section, of the parts illustrated in Fig. 25; Fig. 27 is a detail sectional plan view illustrating a portion of the connections for imparting lateral swinging movements to one of the needles; Fig. 28 is a detail sectional plan view illustrating a portion of the connections for actuating one of the thread fingers of the thread fastener devices; Fig. 29 is a sectional plan view illustrating the mechanism in the lower portion of the machine through which the shoe support and upper pulling grippers are actuated and controlled; Fig. 30 is a vertical sectional view illustrating some of the treadle actuated connections through which the upper pulling grippers and shoe support are actuated and controlled; Fig. 31 is a view in side elevation, partly in section, of the mechanism illustrated in Fig. 29; Fig. 32 is a plan view illustrating the manner in which the shoe is supported in the machine and the manner in which the upper is pulled over the last and its outturned margins clamped against the sole by the upper pulling grippers and thread fastener inserting devices, only so much of the machine being shown as is necessary to indicate the relative arrangement and operation of the parts; Fig. 33 is a detail plan view illustrating the relative position of the shoe, upper pulling grippers and fastener inserting devices at the start of the pulling over operation; Fig. 34 is a view similar to Fig. 33 showing the positions of parts during the pulling over operation just before the thread fasteners are inserted; Fig. 35 is a view in front elevation of the parts illustrated in Fig. 33; Fig. 36 is a view in front elevation of the parts illustrated in Fig. 34; Fig. 37 is a detail view showing somewhat diagrammatically the toe portion of a lasted shoe in a position in the machine with the sole, upper and lining shown in section. In this figure is also shown, by dot-and-dash lines, successive positions of the shoe during movement of the shoe support heightwise of the shoe; Fig. 38 is a detail plan view of the toe portion of a shoe after being acted upon by the machine, illustrating particularly the position of the thread fasteners with relation to the last, outturned margins of the upper and the shoe sole; Fig. 39 is a detail sectional view through the sole and upper of a shoe after being acted upon by the machine and illustrating particularly the form of fastener inserted through the upper and sole by the thread fastening devices; Fig. 40 is a detail perspective view of a portion of the connections for actuating the take-ups of the machine; Fig. 41 is a detail perspective view of a portion of the connections for raising the shoe support; Fig. 42 is a detail perspective view of a portion of the connections for imparting lateral swinging movements to the needles; Fig. 43 is a detail perspective view of a portion of the connections for reciprocating the needles; Fig. 44 is a detail perspective view of a portion of the connections for actuating the thread fingers of the thread fastener inserting devices; Fig. 45 is a detail perspective view of a portion of the connections for manually adjusting the carriers for the upper pulling grippers and thread fastener inserting devices towards and from each other and for automatically moving the carriers during the pulling over operation; Fig. 46 is a detail perspective view, partly in section, illustrating the two banks of cams and the cam actuated levers through which the clutches for driving the two banks of cams are controlled; Fig. 47 is a detail vertical sectional view taken at right angles to the cam shaft and illustrating the Horton clutch for driving the pulling over cams and the levers for controlling the operation of the clutch; Fig. 48 is a detail vertical sectional view on a plane at right angles to the plane of Fig. 47, illustrating the Horton clutch of Fig. 47; Fig. 49 is a view similar to Fig. 47 illustrating the clutch for driving the thread fastener cams and the levers for controlling the clutch; Fig. 50 is a view similar to Fig. 48 of the Horton clutch of Fig. 49; Figs. 51 to 54 inclusive are detail views which, taken in connection with Figs. 47 and 49, illustrate the manner in which the Horton clutches for driving the two banks of cams are controlled; Fig. 55 is a chart indicating the movements and timing of the various operating parts of the machine; Fig. 56 is a view similar to Fig. 29, illustrating a modified construction for controlling and actuating the shoe support and upper pulling grippers; Fig. 57 is a view in front elevation, partly in section, of the mechanism illustrated in Fig. 56; Fig. 58 is a detail, partly in section, showing in side elevation a portion of the mechanism illustrated in Figs. 56 and 57; Fig. 59 is a detail view illustrating in side elevation a modified construction for imparting movement to the shoe support heightwise of the shoe; Fig. 60 is a detail sectional view illustrating in rear elevation a portion of the mechanism shown in Fig. 59; Fig. 61 is a plan view of the mechanism illustrated in Fig. 59; Figs. 62 and 63 are detail views of portions of the mechanism illustrated in Figs. 59, 60 and 61; and Fig. 64 is a diagram indicating the different paths through which the shoe support may be moved by an adjustment of the mechanism illustrated in Figs. 59 to 63.

The manner in which a last with an upper thereon is supported in the machine and the general arrangement of the various parts which act on the shoe upper and their mode of operation will be readily understood from an inspection of Figs. 32 to 39 inclusive. In these figures, a last 2 with an upper 4 and a sole 6 is mounted upon a support 8 and is pressed down upon the support by means of a holddown 10 which presses upon the upper surface of the toe portion of the last supported upper. At each side of the shoe support 8 in position to engage the marginal portion of the upper at the forepart of the shoe, a pulling over gripper mechanism indicated generally at 12 is located and also on each side of the shoe support in position to act on the last supported upper and shoe sole between the gripper mechanism and the toe of the shoe, an upper wiping and fastener inserting mechanism indicated generally at 14 is located. When the last with the sole tacked thereon and with the upper drawn thereover and approximately positioned by hand is first placed in the machine, the upper pulling grippers, wiper plates and thread fastening devices are located at a distance laterally from the last, the wiper plates of the thread fastener mechanisms being out of contact with the shoe upper and the pulling over grippers being open. After the last with the sole and upper thereon have been placed on the shoe support, the margins of the upper are inserted by hand between the jaws of the grippers and then by the depression of a foot treadle, the grippers are caused to grip the upper. Depression of the treadle also causes a preliminary upward movement of the shoe support, thereby causing the upper to be drawn tightly over the last. If at this point in the operation, the upper appears not to be properly positioned on the last, a release of the treadle by the operator causes the grippers to open and permits a readjustment of the upper. After the upper is properly positioned, and the grippers have been again caused to grasp the upper, the power actuated parts of the machine are thrown into operation, thereby causing the upper pulling grippers and the wiper plates to be moved towards the last, the upward movement of the shoe support to be completed and causing the holddown 10 to press upon the shoe and hold it in position during its upward movement. The upper pulling grippers are arranged, as indicated in Fig. 35, to hold the marginal portions of the upper outturned away from the last and during the upward movement of the shoe support, the inner ends of the upper jaws of the grippers bear against the upper and press it tightly against the sides of the last so that the grippers act as wipers during their pulling action. During the initial upward movement of the shoe support under the control of the treadle, the wiper plates of the fastener inserting devices are held a short distance away from the sides of the last out of contact with the shoe upper, as indicated in Fig. 33. As the shoe support begins its final power actuated upward movement, however, the wiper plates are allowed to move inwardly so as to press the upper against the sides of the last, as indicated in Fig. 34, in which position they remain until the shoe support completes its upward movement. At the completion of the upward movement of the shoe support, the lower jaws of the grippers are moved away from the upper jaws to release the upper, as indicated in Fig. 36, and the outturned margins of the upper are pressed against the upper surface of the projecting sole. Also, at this time, the outturned margins of the upper are firmly clamped between the under surface of the wiper plates of the thread fastener mechanisms and the upper surface of the projecting sole edge by the work tables of the fastener mechanisms which complete their upward movement at this time, as indicated in Fig. 36. While the outturned margins of the upper are thus clamped against the projecting shoe sole, thread fasteners passing through the sole and the outturned margins of the upper are inserted, as indicated in Fig. 38. These fasteners pass through the upper and sole in a direction heightwise of the shoe and substantially perpendicular to the shoe sole and are located close to the last in the angle between the side of the last and the projecting sole and thus are adapted to retain the upper securely in the position to which it has been drawn by the cooperative action of the grippers, wiper plates and shoe support. After the insertion of the fasteners, the various parts of the thread fastener mechanisms return to their original positions, the shoe support is lowered, the holddown is raised, and the shoe is freed so that it can be removed from the machine.

The shoe support 8 comprises a body or base portion in the form of a rectangular block which is supported in the machine so as to be capable of a movement upwardly and to the left, as viewed in Fig. 3, and a return movement. To support the shoe support in this manner, the base 8 is pivotally mounted between the outer ends of arms 16 extending from a sleeve mounted on a pivot shaft 18 and the base is also provided at each side above the pivotal connections of the arms 16 with upwardly extending arms 20 in each of which is mounted a roll 22 which engages and is arranged to slide in a curved guideway 24 formed in a fixed part of the machine frame. The arrangement of the arms 16 and curved guideways 24 is such that during the movements of the shoe support, its angular position with relation to a horizontal plane remains unchanged.

In addition to the base portion 8, the shoe support comprises a heel rest to support and center the heel portion of the shoe and a toe gage and centering device which determines the lengthwise position of the shoe with relation to the upper gripping and securing devices. The shoe is supported in the machine right side up, with the forepart of a sole, which has been secured to the bottom of the last, resting on blocks 26 secured to the upper surface of the base 8. In being placed in position by the operator, the toe end of the last is brought into engagement with the toe gage indicated at 28 (see Figs. 20, 21 and 37), which bears against the last 2 above the last bottom and extends beneath the outwardly projecting margin of the upper 4. The toe gage is in the form of a plate secured to a carrier block 30 mounted to slide on the base 8 and held in adjusted position by a vertical locking plunger 32 mounted in the block 30 and provided at its lower end with a tooth to engage any one of a series of cooperating notches 34 formed in the upper surface of a plate 36 secured to the base 8. To raise the locking plunger so as to permit an adjustment of the toe gage, a manually operable lever 38 is pivotally mounted between ears 39 projecting upwardly from the block 30. At one end the lever 38 extends in convenient position to be manipulated by the operator and at its other end has a pin and slot engagement with the upper end of the plunger 32. A spring 40 seated in a recess in the block 30 passes upwardly on the lever 38 at the opposite side of the pivot from the plunger 32 and serves to hold the plunger in locking position.

The centering device for the toe portion of the shoe comprises two levers 42 pivotally mounted upon the block 30 and arranged with their free ends extending on both sides of the plate 28 in position to bear against the toe portion of the last. On each lever 42 mid-way between its ends is pivotally mounted a block 44 which is threaded to receive the right and left threaded portions of a horizontal adjusting shaft 46. To hold the shaft 46 from longitudinal movement, it is provided mid-way between its ends with a disk-like portion 48 which is received between the upstanding ears 39 of the block 30.

The heel rest for the shoe, see Figs. 3, 22, 23, 24 and 32, comprises a block 50 having a substantially horizontal arm 52 arranged to extend lengthwise of the shoe beneath the heel portion and provided at its end with an upwardly projecting boss to engage the shoe sole. From the block 50 above the arm 52, diverging arms 54 also extend to form a centering fork for the heel portion of the shoe.

The heel rest comprising the block 50 is mounted so as to be movable towards and from the toe gage 28 to position the shoe in the machine and is also provided with means for adjusting lengthwise and heightwise of the shoe, and angularly in a vertical plane to adapt the machine for operation on shoes of different sizes and styles. To permit the heel rest to move towards and from the toe gage, the block 50 is secured to the upper end of a vertically arranged arm 55 pivotally mounted at its lower end upon an arm 56 projecting downwardly from a block 58 secured to a horizontal rod 60 projecting from the shoe support 8. A spring 62 stretched between pins on the arm 54 and block 58 tends to move the upper end of the arm with the heel rest 50 towards the toe gage while permitting the arm to be moved in the opposite direction by the operator in applying a shoe to the machine. Projections 64 and 66 on the arm 55 arranged to engage opposite sides of the arm 56 limit the movement of the arm 55 in both directions. Adjustment of the heel rest lengthwise of the shoe is secured by mounting the block 58 to slide back and forth on the rod 60. To hold the block 58 in adjusted position, a locking plunger 68 is mounted in the block and the rod 60 is provided with a series of cooperating holes 70. Adjustment of the heel rest heightwise of the shoe is secured by mounting the block 50 in a vertical guideway on the arm 54 and providing a locking plunger 72 on the arm arranged to cooperate with a series of holes 74 bored in the block. The angular adjustment of the heel rest in a vertical plane is secured by the provision of a pivotal connection between the inner end of the rod 60 and the shoe support 8. This pivotal connection comprises a vertical cross head at the inner end of the rod 60 which is received in a vertical slot formed in the end of the shoe support and connected to the support by a horizontal pivot pin 76. A spring-pressed plunger 78 mounted in the support 8 bears against the upper end of the cross head and tends to swing the outer end of the rod 60 downward and a set screw 80 in the lower end of the cross head arranged to bear against the support 8 limits such downward movement and provides a means for adjusting in a vertical plane the angular position of the heel rest.

The pulling over grippers and the upper wiping and fastener inserting devices are mounted upon two carriers located respectively on opposite sides of the work support 8. These carriers are duplicates of each other as are also the means for supporting and adjusting the carriers and the devices and mechanisms mounted on the carriers. Accordingly, it will be necessary to describe but one of these carriers, together with its means of support, and the devices and mechanisms mounted thereon. In order to permit the carriers to be angularly adjusted about substantially vertical axes to adapt the upper pulling grippers and upper wiping and fastener inserting devices for operation on the particular style and size of shoe to be placed in the machine, and to permit the carriers to be moved during the power operation of the machine, each carrier is mounted in the machine as follows:

Referring to Figs. 1, 3, 5, 6, 7 and 11, each carrier comprises a vertically arranged frame 82 which is supported from the main frame 84 of the machine by upper and lower links 86 and 88. The upper link 86 is pivotally mounted at its rear end in a horizontal recess 90 formed in an upstanding lug of the machine frame and at its forward end is pivotally connected to a lug 92 projecting upwardly and laterally from the upper end of the frame 82, a supporting bearing for the lug 92 being provided by a horizontal slot 94 in the forward end of the link 86 which closely fits the portion of the lug 92 engaged thereby. The lower link 88, see particularly Figs. 3 and 7, is in the form of a vertical rectangular plate provided at its four corners with forwardly and rearwardly projecting lugs. Vertically arranged pivot pins 95 connect the rearwardly projecting lugs to the main frame of the machine and short vertically arranged pivot pins 97 connect the forwardly projecting lugs with the carrier 82. The carrier 82 is thus supported from the fixed frame of the machine so that it can move in a horizontal plane towards and from the shoe support 8, the links 86 and 88 during such movement swinging about the pivot pins 95 which connect their rear ends with the fixed frame.

The pivotal connections of the forward ends of the links 86 and 88 with the carrier 82 are in vertical alignment so that an angular movement of the carrier 82 about the vertical axis formed by these pivots is permitted. To adjust the carrier about this axis and also to hold the carrier in the desired angular position during any movements of the carrier towards and from the shoe support, a link, in the form of a swinging bracket 96 (see Figs. 5 and 13), is pivotally mounted at its inner end on the fixed frame of the machine and is connected by a plate-like link 98 to the upper outer portion of the carrier 82. To pivotally connect the swinging bracket 96 to the fixed frame of the machine, it is provided at its inner end with upper and lower lugs which extend above and below supporting lugs on the fixed frame of the machine, and to pivotally connect the plate-like link 98 to the link 96 and to the carrier 82, the link 98 is provided at its four corners with upper and lower lugs extending over and under lugs formed on the link 96 and on the carrier 82. At its outer end, the swinging link 96 is provided with a vertically arranged spring-pressed locking plunger 100 arranged to cooperate with a series of cooperating holes 102 formed in a bracket forming a part of the fixed frame of the machine. As will be obvious from an inspection of the drawings and particularly Figs. 5, 7 and 11, an adjustment of the link 96 acting through the link 98 will produce an angular adjustment of the carrier 82 about a vertical axis and during any movement of the carrier towards and from the shoe support its angular position will be maintained by the cooperative action of the link 98 and the supporting links 86 and 88.

Each pulling over gripper (see particularly Figs. 18 and 19) comprises cooperating gripping jaws 104 and 106 pivotally mounted upon a bracket 108 which is connected to a carrier 82, as will be presently described. The upper jaw 104, except for a slight yielding pivotal movement, remains stationary with relation to the bracket 108 during the operation of the machine with its upper engaging face substantially horizontal and in position to engage the outer surface of a shoe upper. To permit the jaw 104 to yield slightly when the upper is pressed against it by the lower jaw 106, the outer end of the jaw 104 is provided with a threaded boss engaged by an adjusting set screw 110, the lower end of which projects below the lever and is provided with a flange engaging a spring 112 interposed between the flange at the lower end of the set screw and the bottom of a recess formed in the bracket 108. A lock nut 114 engaging the threaded portion of the set screw above the jaw 104 serves as a means for locking the set screw in adjusted position. The spring 112, as will be obvious from an inspection of Fig. 19, permits the jaw 104 to yield upwardly under the upward thrust of the lower jaw 106, the stroke of which latter jaw is positively limited by the engagement of the outwardly extending arm of the jaw with a stop plate 116 rigidly secured to the bracket 108. This construction and arrangement of the gripping jaws permits an adjustment of the pressure exerted by the jaws on the upper to cause the upper to be securely grasped while permitting the upper to slip through the jaws in the event of any excessive strain on the upper during the pulling over operation. To move the lower jaw 106 towards and from the upper jaw 104, the jaw near its inner end is connected by means of a link 118 to a piston 120 mounted to reciprocate in a cylindrical chamber 122 formed in the bracket 108 and means for reciprocating the piston 120 in opposite directions are provided comprising a pipe 124 to conduct fluid to the outer portion of the cylindrical chamber and a spring 126 surrounding the link 118 and interposed between the bottom of a recess in the inner end of the piston and a fixed plate 128 at the inner end of the cylindrical chamber. Means for supplying fluid under pressure through the pipe 124 to close the grippers and for relieving the pressure of the fluid so as to permit the spring 126 to open the grippers will be hereinafter described.

When a last with the sole and upper thereon is first placed in the machine, the upper pulling grippers and the thread fastening devices are located at a distance laterally from the last and while the grippers are in this position, the outturned margins of the upper are placed between the jaws of the grippers. Thereafter, the grippers are caused to close upon the margins of the upper and the carriers on which the grippers and the thread fastener devices are mounted are moved towards each other until the upper is pressed against the sides of the last by the contact therewith of the inner ends of the gripper jaws 104 and the inner edges of the wiper plates of the thread fastener mechanisms. To insure the firm engagement of both the grippers and the wiper plates with the upper, the blocks 108 of the gripper mechanisms are yieldingly mounted on the carriers 82, this construction being best shown in Figs. 18 and 19. As shown in these figures, the block 108 of the gripper mechanism illustrated is supported upon the upper ends of parallel links 130, which links are pivotally mounted in the carrier 82. The pivot shaft of the inner link 130 is provided at its end remote from the link with a downwardly extending arm 132 which is acted upon by a spring 134 stretched between the arm and a pin on the frame 82, the arrangement being such that the spring tends to move the bracket 108 with the grippers 104 and 106 yieldingly towards the last of a shoe supported in the machine. While the machine is at rest and during the treadle controlled manipulation of the pulling over grippers and shoe support, the bracket 108 with its pulling over gripper is held rigidly locked to the carrier 82 by means of a detent 136 pivotally mounted on the carrier 82 and arranged with its free end in position to engage a roll 138 at the lower end of the arm 132. At the beginning of the power operated upward movement of the shoe support, and after the carrier 82 has been moved inwardly to bring the inner end of the gripper jaw 104 into pressing engagement with the upper, the detent 136 is raised by means of a link 140, actuated as hereinafter described, to release the bracket 108 and permit the bracket to yield until the wiper plate of the thread fastener mechanism is brought into pressing engagement with the upper. At the completion of the operation on the shoe and as the carrier 82 moves away from the last, the detent 136 is returned to locking position by means comprising a spring 142 stretched between the detent and a pin on the lever, hereinafter described, to which the lower end of the link 140 is connected.

The fastener inserting mechanisms of the machine are adapted to form and insert thread fasteners of the character indicated in Figs. 38 and 39. Each of these mechanisms comprises a table or work support against which the outturned margin of the upper and projecting sole are clamped and which also acts as a wiper to press the upper against the last during the upward movement of the shoe support, a clamping table or presser between which and the work supporting table the upper margin and the sole is clamped, a reciprocating eye pointed needle, a thread finger, and a take-up. One of these fastener inserting mechanisms, with the exception of the take-up, is illustrated in detail in Figs. 14 to 17. Referring to these figures, the work supporting table, indicated at 144, is secured on the upper surface of a block 146 bolted to and projecting laterally from a vertical web-like portion of the carrier 82. The work support 144 is thus connected rigidly with the carrier 82 and has no movement with relation thereto. Its inner end is adapted to press the upper against the side of the last and act as a wiper during the upward movement of the last with the shoe support 8 and its under surface is arranged to extend over the outturned margin of the upper and the projecting shoe sole.

The clamping table, indicated at 148, forms part of a bracket 150 bolted to a slide 152 mounted upon a guide plate 154, see particularly Fig. 17, bolted to the web of the carrier 82 in a position slightly inclined to the vertical, see Fig. 14. The clamping table 148 is arranged with its upper surface in position to cooperate with the lower surface of the work table 144 in clamping the outturned margin of the upper and shoe sole and during the operation of the machine, is moved towards and from the work table 144 by reciprocating the slide 152. To permit the clamping table 148 to force the upper and sole against the work table 144 with a yielding pressure, a slide 156 is held in a vertical guideway in the slide 152 by a cap plate 158, see Figs. 16 and 17, and is yieldingly connected to the slide 152 by two coiled springs 160 seated in longitudinal recesses in the slide 156 and interposed between the bottoms of the recesses and blocks 162 located at the upper ends of the recesses and mounted on pins projecting from the slide 152. Mechanism for actuating the slide 156 will be hereinafter described.

The needle, indicated at 164, is secured in a carrier frame 166, and projects upwardly in position to pass through openings in the clamping table 148 and in the work table 144. The needle carrier frame 166 is mounted to reciprocate in a direction slightly inclined to the vertical parallel to the direction of movement of the slide 152 to which the clamping table 148 is secured. To support and guide the needle carrier frame 166, a cylindrical rod 168 is rigidly secured to the frame and extends upwardly from a laterally extending arm at the lower end of the frame 166 through a guiding lug 170 rigid with the carrier 82, through a laterally extending arm at the upper end of the frame 166 and through a bearing formed in the block 146 and work table 144. In addition to its reciprocating movements, swinging movements at right angles to its reciprocating movements are imparted to the needle carrier frame 166. To this end, an elongated bearing block 172 is mounted on a pivot pin 174 extending between the outer ends of the laterally extending arms of the needle carrier frame and is slidingly engaged by the slotted end of an arm 176 projecting from the upper end of a rock shaft 178 mounted in a bearing in the carrier 82. Oscillating movements in timed relation to the reciprocating movements of the needle carrier frame 166 are imparted to the work shaft 178 through mechanism hereinafter described.

The thread fasteners formed and inserted by the thread fastener mechanisms are the same as the fastener disclosed in the patent to La Chapelle No. 1,185,108, dated May 30, 1916, with the exception that in the present machine, two thread fasteners are inserted by each mechanism while the last with the upper and sole thereon remain stationary and these fasteners are connected by a stretch of thread and are located in a line extending lengthwise of the last close to the side of the last. In forming the fasteners, each needle makes four complete reciprocations while the margin of the upper and projecting sole are held clamped between a work table 144 and a clamping table 148. Four loops of thread are thus forced upwardly through the sole and upper and are spaced lengthwise of the last by a step by step swinging movement of the needle carrier frame 166. The thread finger, indicated at 180, which is located above the work table 144 and the inner end of which is shaped like the thread finger of the La Chapelle mechanism, acts to pass the first of these loops through the second prior to the forcing of the third loop through the work and thereafter passes the third of these loops through the fourth. The encircling loops are tightened successively by a take-up acting as in the La Chapelle mechanism. Two connected fasteners are thus formed, each consisting of thread surrounding the material of both the upper and sole and binding the upper and sole tightly together. After the completion of the fasteners, the thread is severed by a knife acting on the thread below the clamping table while the table is in clamping position.

The thread finger projects laterally over the work table 144 from a block 182 secured to the upper end of a rock shaft 184 which is actuated in timed relation to the movements of the needle through mechanism hereinafter described. The knife for severing the thread is indicated at 186 and consists of a blade loosely mounted upon pins 188 projecting upwardly from a block 190 pivotally mounted on the upper end of a lever arm 192, the lower end of which is pivotally mounted on the slide 152. The knife slides on the under surface of the clamping table 148 and is held against this surface by the block 190 which is acted upon by springs 194 coiled about the pivot pin of the block and acting at one end against the block and at the other end against the lever arm 192. The mechanism for actuating the knife comprises a link 196 connected at its inner end to the lever arm 192 and at its outer end to an arm 198 fast on a rock shaft 200 journaled in the carrier 82. At its end remote from the arm 198, the shaft 200 is provided with an arm 202 which extends into the path of a pin 204 projecting from the slide 156 from which the clamping table 148 is actuated. The pin 204 is so located that the upward movement of the slide 156 to bring the table 148 into clamping engagement with the work does not bring the pin into contact with the arm 202. After the thread fastener is completed, however, a further upward movement is imparted to the slide 156, such movement being permitted by the yielding connection between the slide 156 and the slide 152 on which the clamping table is mounted, and the pin 204 is caused to raise the arm 202 and through the connections described advance the knife 186 across the needle opening in the clamping table 148 and sever the thread. A spring 206 stretched between the arm 198 and a pin on the carrier 82 imparts a retracting movement to the knife which is limited by contact of the arm 198 with a stop pin 208 on the carrier 82.

The take-ups are best illustrated in Figs. 6, 7 and 11. Each take-up comprises a take-up roll 208 mounted upon the outer end of a take-up lever 210 pivotally supported intermediate its ends on a bracket 212 bolted to a carrier 82. A portion of the connections for actuating each take-up comprises an L-shaped link 214, see Fig. 7, extending between the inner end of the take-up lever 210 and the inner end of an arm 216 pivoted at its outer end on the bracket 212 and extending parallel with the inner end of the take-up lever. The inwardly extending arm of the L-shaped link is slotted and through this slot a cross pin 218 in the yoke-shaped end of a lever 220 extends, see Fig. 11, whereby an adjustment of the carrier 82 about a substantially vertical axis, as hereinbefore described, is permitted without interfering with the actuation of the link 214 from the lever 220. The complete train of connections for actuating the take-up will be hereinafter described.

The supply of thread for the thread fastener is contained in two holders 222 supported on a bracket at the front of the base of the machine, see Figs. 1 and 2. From each holder, the thread leads upwardly to a guiding eye 224 in the outer end of a plate 226 secured, as will be presently described, to a bracket 228 bolted to the carrier 82, see Figs. 11, 25 and 26.

From the guiding eye 224, the thread leads through a guide eye in a pin 230, then between tension disks 232 of ordinary construction, and then around guiding rolls 234, 236 and 238, all of said guides and the tension disks being mounted on the plate 226. From the guide roll 238, the thread leads over guide rolls 240 and 242 mounted upon the bracket 212 in which the take-up lever is pivotally supported, then around the take-up roll 208, then under a guide roll 244 mounted on an arm of the bracket 212, and then upwardly through a perforation in the needle carrier 166 to the eye of the needle 164. To lubricate the thread in its passage from the supply holder 222 to the needle, the guiding roll 236 is mounted on a downwardly projecting arm of the plate 226 and is immersed in a lubricant of suitable character contained in a lubricant holder 246. This lubricant holder is bolted to the bracket 228 above referred to, and in the construction shown, forms a support for the plate 226, a portion of the plate being shaped to form a cover for the lubricant holder and the plate being held firmly in place by two swinging bolts, indicated at 248 and 250. Of these bolts, the bolt 248 is pivotally mounted between ears projecting from the upper portion of the lubricant holder and extends upwardly through a slot in the cover portion of the plate 226, where it has a threaded engagement with a locking nut 252. The bolt 250 is formed with a rectangular portion at its upper end which is slotted to receive a downwardly projecting flange of the plate 226 to which it is pivotally connected. The bolt 250 is adapted to extend downwardly through a slotted lug 254 projecting from the lower portion of the lubricant holder 246 and is provided below the lug 254 with a spring 256 coiled about the bolt and interposed between the lower surface of the lug 254 and a nut 258 at the lower end of the bolt, which spring acts to force the upper rectangular portion of the bolt downwardly into a notch formed on the upper side of the lug 254. This construction holds the plate 226 with its thread guides rigidly in position while permitting ready removal of the plate, as may be desired. The thread passes downwardly from the guide roll 234 through a perforation in the cover plate 226 and after being immersed in the lubricant, passes upwardly to the roll 238 through a stripper 260 of usual construction.

To provide a constant supply of lubricant to the holder 246, a holder of ordinary construction adapted to contain a considerable supply of lubricant is mounted on the upper portion of the machine base, as indicated in Figs. 1 and 2 at 262. From the lower portion of the holder 262, a delivery pipe 264 leads to a cross pipe 266 (see Fig. 3), which is connected at its opposite ends to pipes 268 which extend upwardly and open into the bottom of the lubricant holders 246.

As has been stated, the pulling over grippers are closed and a preliminary upward movement is imparted to the shoe support upon the depression of a foot treadle. This treadle is indicated at 270 (see Figs. 1 and 2), and in the construction illustrated is also utilized to throw into operation the cams by which the power operated parts of the machine are actuated. These cams are mounted upon a shaft 272 and are driven, as hereinafter described, from Horton clutches mounted on a shaft 274 below the shaft 272 and driven through belts and pulleys, as shown, from a motor 276. To permit the shaft 274 to be turned by hand independently of the driving belts and pulleys, the pulley 275 (see Fig. 9) on the shaft, over which the driving belt passes, is mounted to rotate loosely on the shaft and is connected to the shaft by a spring-pressed locking plunger 277 mounted in the hub of a hand wheel 279 pinned to the shaft.

The connections actuated by the treadle 270 for causing the closure of the pulling over grippers and for imparting a preliminary upward movement to the shoe support are best shown in Figs. 2, 29, 30 and 31. As shown in these figures, the treadle 270 is connected by a link 278 to the forward end of a lever 280 fast on a pivot shaft 282, the rear end of which lever is pivotally connected to a sliding bar 284 mounted to slide vertically in a guideway in the machine base but capable of a swinging movement about its pivotal connection with the lever 280. At its upper end, the bar 284 is provided with a laterally extending lug 286 and with an upwardly extending finger 288. Above the bar 284 are two vertical slides 290 and 292, the lower ends of which are arranged to be engaged by the lug 286 at the upper end of the bar 284 and the upper ends of which are provided with inclined surfaces 294 and 296, respectively, forming cams to cooperate with followers on the vertical arms of bell cranks 298 and 300 mounted on a pivot shaft 301. The horizontal arm of the ball crank 298 is pivotally connected to the lower end of a link 302 which forms a part of the connection for raising the shoe support and the horizontal arm of the bell crank 300 is connected by a link 304 to the upper end of the stem of a piston valve 306 which controls the pressure of the fluid for operating the lower jaws of the upper pulling grippers. Depression of the treadle 270 raises the slides 290 and 292 through the engagement of the lug 286 with the lower ends of the slides, causing first the bell crank 300 and then the bell crank 298 to be swung in a clockwise direction. Locking pawls 308 and 310 are pivotally mounted on the machine base below the slides 290 and 292 in position to bear laterally at their upper ends against the slides and a spring 312 engaging the ends of the pawls below their pivots tends to swing them beneath the slides and lock the slides in fully raised position. The cam surfaces 294 and 296, however, are so located on the slides that the bell cranks 298 and 300 are actuated before the slides are raised high enough to permit the pawls 308, 310 to pass beneath the slides and thus a preliminary or trial closing of the grippers and a partial upward movement of the shoe support may be made as hereinbefore described.

Depression of the treadle 270 sufficiently to throw the power actuated mechanism of the machine into operation raises the slides 290, 292 sufficiently to permit the pawls 308, 310 to move beneath the slides and lock them in raised position. At the proper time during the operation of the machine, the slide 292 is released to permit the slide to fall and cause the grippers to open and at the end of the operation of the machine, the slide 290 is released and allowed to fall and permit the shoe support to be lowered to its initial position. To release the slide 292, a lever 314 is mounted on the pivot shaft 301 and is provided at its lower end with a laterally extending pin 316 arranged upon a counterclockwise movement of the lever to engage an upward projecting finger of the pawl 310 and move the pawl from beneath the slide. To permit the slide 292 to descend at this time, even if the treadle 270 is still held depressed, the pin 316 is also arranged to engage the upwardly projecting finger 288 of the bar 284 and swing the bar against the force of a laterally pressing spring 318 to remove the lug 286 from beneath the slides 290, 292. To release the slide 290, a lever 320 is also mounted on the pivot shaft 301 and is provided at its lower end with a pin 322 arranged to act on the pawl 308. The levers 314 and 320 are moved by cam actuated levers through connecting links 324 and 326, respectively. The slides 290, 292 are moved downwardly when released by the pawls 308, 310 by springs 328, 330, stretched between pins on the upper ends of the slides and on the base of the machine.

The fluid for actuating the pulling over grippers is supplied from a pump 332 (see Figs. 1 and 2), driven by a belt 334 passing over pulleys on the shaft 274 and the shaft of the pump. From one side of the pump 332 a pipe 336 extends horizontally to a cross pipe which connects with the pipes 124 hereinbefore described as opening into the lower ends of the cylinder chambers 122. Adjacent the pump 332, the horizontal pipe 336 connects with a pipe 338 which, at its lower end, discharges into a chamber 340 formed in a casing 342 extending into a tank 344 and surrounded by liquid in the tank. The piston valve 306, see Fig. 31, extends through the casing 342 and by its upward and downward movement, opens and closes communication between the chamber 340 and the tank 344. From the tank 344, a pipe 346 extends upwardly to the opposite side of the pump 332 from the pipe 336. The result of this construction is that when the piston valve 306 is raised by the movement of the bell crank 300, as hereinbefore described, communication between the chamber 340 and the tank 344 is closed and consequently the pressure of the liquid in the pipes 124 is built up sufficiently to actuate the pistons 120 against the force of the springs 126 and close the lower jaws 106 of the upper pulling grippers against the upper jaws 104 of the grippers. The grippers remain closed until the piston valve 306 is lowered, which movement is produced by a spring 348 seated in a recess in the valve casing between the upper end of the recess and a shoulder on the lower end of the valve, the downward movement taking place as soon as the bell crank 300 is released by the downward movement of the slide 292. The downward movement of the piston valve 306 re-establishes communication between the chamber 340 and the tank 344, thereby reducing the pressure of the fluid in the pipes 124 sufficiently to permit the lower jaws of the grippers to be moved away from the upper jaws by the springs 126. It is to be noted that this opening movement of the gripping jaws 106 takes place prior to the completion of the upward movement of the shoe support so that the projecting shoe sole will not be bent downwardly by contact with the jaws.

To impart the preliminary upward movement to the shoe support from the bell crank 298, see Figs. 3, 31 and 41, the link 302 is pivotally connected at its upper end to a lever arm 350 pivotally mounted in the machine frame and connected by a link 352 with a link 354 of a toggle forming a part of the cam actuated connections for raising the shoe support. The other link of the toggle is indicated at 356, see particularly Fig. 41, and the toggle is interposed between a lever 358 actuated by a cam on the shaft 272 and an arm 360 projecting downwardly from the sleeve carrying the arms 16 hereinbefore described. During the upward movement of the link 302, the lever 358 is held stationary by its cam and consequently the upward swinging movement of the arm 350 imparted by the upward movement of the link 302 straightens to some extent the toggle formed by the links 354, 356 and swings the arms 16 upwardly to raise the shoe support. During the power operation of the machine, the arm 350 is held stationary and the final upward movement and the first portion of the downward movement are imparted to the shoe support from the cam actuated lever 358 through the connections described. At the completion of the operation on the shoe, the final downward movement of the shoe support is produced by a downward movement of the link 302, which movement is effected by a spring 362 connecting a pin at the upper end of the link 302 with the frame of the machine as soon as the bell crank 298 is released by the downward movement of the slide 290.

Prior to the power operated upward movement of the shoe support, the holddown 10 is brought down against the shoe and presses the shoe firmly against the shoe support. This movement of the holddown is produced from a cam on the shaft 272 through a cam lever 364 (see Fig. 4) which is connected by a link 366 to an arm 368 projecting from a rock sleeve 370. Another arm 372 of the sleeve 370 is connected by a rod 374 to the rear end of the lever 376 which carries the holddown 10 at its forward end. The rod 374 is pivotally connected to the arm 372 and at its upper end passes loosely through a block 378 pivotally mounted at the rear end of the lever 376. A nut on the upper end of the rod 374 engages the upper surface of the block 378 and a spring 380 is coiled around the rod 374 and presses upwardly against the under surface of the block 378 and thus forms a yielding connection in the train of connections through which the holddown is actuated from the cam.

The carriers 82 and the operating devices mounted on the carriers are actuated from cams on the shaft 272 through connections which are constructed and arranged to operate without interference in all positions of adjustment of the carriers and to permit any desired movements of operation or adjustment of the carriers.

The mechanism for moving the carriers 82 upon which the upper pulling grippers and fastener inserting devices are mounted towards and from each other comprises a cam actuated lever arm 382, see Fig. 45, secured to a rock shaft 284. At each end of the rock shaft 384 an arm 386 is secured which is connected by a rod 388 to the horizontal arm of a bell crank 390, the vertical arm of which is connected by a link 392 to a laterally extending arm of one of the links 88 by which the carriers 82 are supported, as hereinbefore described, see Figs. 3, 7 and 11. To provide a yield in these connections for moving the carriers 82 and to permit a manual adjustment of the carriers independently of each other, each rod 388 is screw-threaded at its lower end in a block 394 pivotally mounted on arm 386 and at its upper end has a sliding engagement with a block 396 pivotally mounted on an arm 390, a collar 398 being provided on the rod to engage the upper surface of the block 396 and a second collar 400 being provided near the lower end of the rod, between which latter collar and the lower surface of the block 396 a spring 402 is coiled around the rod and presses upwardly against the block 396. The movement of the cam actuated lever 382 is thus yieldingly transmitted to the bell crank 390 and the position of the bell crank, and consequently the position of the carrier 82 connected thereto, can be adjusted independently of the other carrier and without affecting the spring 402 by screwing the rod 388 through the block 392. To facilitate this manual adjustment, each of the rods 388 is provided with a knob 403 at its upper end. To permit free movement of the parts, each link 392 is pivotally connected at its ends to blocks pivotally mounted respectively on the vertical arm of the bell crank 390 and on the lateral arm of the carrier 82.

The clamping tables 148 of the fastener inserting mechanisms are actuated from a cam on the shaft 272 through connections comprising a cam lever 404, see Fig. 3. The upwardly extending arm of this lever is connected by duplicate links 406 to the inner ends of arms 408 secured to the lower ends of vertical rock shafts 410, one of which is mounted in each carrier 82, see Figs. 6, 11, 14 and 15, the pivotal connection of the links 406 with the arms 408 being substantially in line with the vertical axis about which the carriers 82 are angularly adjustable, as hereinbefore described. To the upper end of each shaft 410 a block 412 is secured provided with bevel gear teeth arranged to mesh with bevel gear teeth on a block 414 secured to a horizontal rock shaft 416 journaled in the carrier 82. To the rock shaft 416 is secured a laterally extending arm 418 provided at its inner end with a block 420, see Fig. 16, received in a slot in the lower end of the slide 156, which is connected to the slide 152 carrying the work clamping table 148, as hereinbefore described.

The lower end of the link 140 hereinbefore referred to, through which the detent 136 is raised, see Fig. 14, is connected to the arm 418 by a slot 421 formed in the link and a pin 423 projecting from the arm through the slot, by which construction the detent is raised during the upward movement of the arm, and a downward movement of the arm is permitted until the outward movement of the carrier 82 relieves the pressure of the arm 132 against the detent and permits the spring 142 to lower the detent to locking position.

The cam lever for imparting vertical reciprocating movements to the needle carrying frames 166 is indicated at 422, see Fig. 43. The connections from the cam lever 422 to the frames 166 comprise two reciprocating cross heads in the form of sleeves 424, see Figs. 8 and 12, mounted to slide on the pivot pins 95 which connect the supporting links 88 of the carrier 82 with the machine frame. The forward end of the lever 422 extends between the sleeves 424 and is provided with a cross pin on the ends of which rolls are mounted which engage grooves in the sleeves. The groove in each sleeve 424 is also engaged by a roll on the rear end of a lever 426 which is pivotally mounted intermediate its ends on a supporting link 88, see Fig. 7, and is provided at its forward end with a cross pin extending horizontally through a slot in a block 428 secured to a vertical rod 430. The rod 430 is mounted to slide in the carrier 82 and is provided at its upper end with a block 432, see Figs. 14 and 15, connected by a link 434 to the inner end of an arm 436 pivotally mounted at its outer end on the carrier 82. The pivot pin connecting the link 434 and arm 436 projects from the arm and is provided with a roll 438 engaging a slot 440 in the lower end of the needle carrying frame 166.

A portion of the train of connections for actuating each take-up including a lever 220, see Fig. 7, has already been described. The remaining connections, see Figs. 7, 8, 11, 12 and 40, comprise a reciprocating cross head 442 in the form of a sleeve mounted upon a pin 444 secured in the laterally extending arm of the carrier supporting link 88 parallel with the pivot pins 95. On one side the sleeve 442 is engaged by a block 446 pivotally mounted on the rear end of the lever and sliding in a straight groove in the sleeve 442 and on the other side the sleeve is engaged by a block 448 pivotally mounted on the end of a cam actuated arm 450 and sliding in a curved groove in the sleeve. The cam actuated arms 450, see particularly Fig. 40, are secured to a rock shaft and form the hub of one of the arms, an arm extends into engagement with a cam on the shaft 272.

The rock shaft 178, see Fig. 14, is actuated to impart swinging movements to the needle carrier 166 by cam actuated connections comprising an arm 452 secured to the lower end of the shaft 178 and connected by a universal joint to the forward end of a link 454, see Fig. 15. At its rear end, the link 454 is connected by a universal joint to a cross head 456, see Figs. 3, 7, 11 and 12, at the forward end of a slide 458 mounted in the machine frame and connected at its rear end by a link 460 with a cam lever 462, see Fig. 42.

The connections for rocking the shaft 184, see Fig. 14, to actuate the thread finger 180, comprise an arm 464 secured to the lower end of the shaft, a lever 466, see Figs. 14 and 28, pivotally mounted on a bracket bolted to the carrier 82 and provided at its outer end with gear teeth meshing with gear teeth on the arm 464, a link 468 connected by a universal joint at its forward end to the inner end of the lever 466 and at its rear end to a cross head 470, see Figs. 3, 7 and 12, a slide 472 mounted in the machine frame, to which the cross head 470 is secured and a link 474 connecting the slide 472 to a cam lever 476, see Fig. 44. To take up back lash in the connections, a spring 478 is stretched between a pin on the arm 464, see Fig. 28, and a point on the carrier 82.

The cams on the shaft 272 are arranged in two sets of banks, see particularly Fig. 46, one bank being secured to a sleeve 480 mounted to rotate on the shaft 272 and the other bank being secured to a sleeve 482 mounted to rotate on the shaft 272 independently of the sleeve 480. The cams which are secured to the sleeve 480 actuate the needle carrier, take-up and thread finger of the thread fastener mechanisms and for convenience, this bank of cams will be termed the thread fastener cams while the bank of cams secured to the sleeve 482 will be termed the pulling over cams. Each bank of cams is driven from a Horton clutch, there being a clutch for each bank. The banks rotate in opposite directions and the pulling over clutch rotates four times for each revolution of the pulling over bank while the thread fastener clutch rotates two times for each revolution of the thread fastener bank. During a complete cycle of operations of the machine, the pulling over bank rotates 180° and stops, the thread fastener bank then rotates 360° and stops, and finally the pulling over bank again rotates 180° and stops.

The pulling over bank is started from the foot treadle 270 and is stopped automatically by connections actuated by the pulling over bank. The thread fastener bank is started automatically by connections actuated by the pulling over bank and is stopped by connections actuated by the thread fastener bank. The pulling over bank is started the second time automatically by connections actuated by the thread fastener bank and is finally stopped by connections actuated from the pulling over bank.

The Horton clutch, through which the pulling over bank of cams is driven, is shown in Figs. 47 and 48. It comprises the parts ordinarily found in this type of clutch, the driving member consisting of the shell 484 secured to the motor driven shaft 274 and being provided with the internal ring 486 secured thereto, and the driven member consisting of the cam surfaced sleeve 488 integral with the pinion 490 which, through the intermediate gear 491, drives a gear 493 rigid with a cam disc of the pulling over bank of cams, see Fig. 46. Between the ring 486 and the cam surfaces of the sleeve 488, the usual rolls 492 are provided located in slots formed by projections from the roll carrying ring 494 mounted on the driven member 488 so as to be capable of a slight independent rotary movement and connected to the driven member by the usual spring 496. A stop shoulder 498 is formed on the ring 494 to cooperate with a clutch controlling tripping lever, and a block 500 is secured to the driven member 488 to cooperate with a rebound preventing latch. The Horton clutch through which the thread fastener bank of cams is driven, is shown in Figs. 49 and 50, and is the same in all essential particulars as the Horton clutch above described, through which the pulling over bank of cams is driven. The parts of the clutch disclosed in Figs. 49 and 50 corresponding to those already described are the shell 502 provided with the internal ring 504, the cam faced sleeve 506 constituting the driven member of the clutch with its integral pinion 508, the clutch rolls 510, the roll carrying ring 512, the spring 514 connecting the driven member of the clutch with the ring, the stop shoulder 516 on the ring 512 to cooperate with a tripping lever and the block 518 secured to the pinion 508 to cooperate with a rebound preventing latch.

To start and stop the bank of cams, the Horton clutches are thrown into and out of operation by mechanism acting on the tripping levers of the clutches.

The tripping lever of the Horton clutch, through which the pulling over bank of cams is driven, is indicated at 520 and is provided at its upper end with a spring supported stopping dog 522 to cooperate with the stop shoulder 498 on the roll carrying ring 494. The trip lever 520 is mounted on a shaft 524 and also mounted on this shaft is a rebound preventing latch 526 to cooperate with the block 500 on the driven member 488 of the clutch. A spring 528 stretched between pins 530 and 532 on the latch and on the trip lever, respectively, holds the latch yieldingly against the pin 532 of the trip lever.

The mechanism which acts on the tripping lever 520 to throw the clutch into and out of operation comprises two actuating members 534 and 536 mounted to slide horizontally through vertical slots formed in a block 538 secured to the lower end of the trip lever 520 below the shaft 524. At their forward ends, the slides are provided respectively with downwardly extending projections 540 and 542, the rear surfaces of which form shoulders to engage the front surface of the block 538. The sliding member 534 is utilized in actuating the trip lever 520 from the foot treadle 270 and the sliding member 536 is utilized in actuating the trip lever from a cam on the pulling over bank of cams. At its rear end, the sliding member 534 is supported by a pin 544 at the lower end of a cam actuated lever arm 546, which pin passes through a horizontal slot 548 in the member 534. The member 534 is thus supported so as to be capable of a horizontal sliding movement independently of the cam actuated lever arm 546. At its rear end, the member 536 is pivotally connected to the lower end of the lever arm 546 by the pin 544 so as to be actuated directly by a movement of the lever arm, such movement of the lever arm being permitted independently of the member 534 by reason of the pin and slot connection between the lever arm 546 and the member 534. While the machine is at rest, the parts are in the position illustrated in Fig. 47. To move the tripping lever 520 from the foot treadle 270, a treadle actuated lever 550 is pivotally mounted in the machine base and at its upper end extends into a position to engage the sliding member 534, the construction being such that a movement of the lever 550 in a clockwise direction imparts a rearward sliding movement to the member 534 and through the engagement of the block 540 and the member with the block 538 at the lower end of the tripping lever, moves the tripping lever to throw the clutch into operation. During this sliding movement of the member 534, it moves with relation to the cam lever arm 546 so that no sliding movement is imparted to the member 536 which is permitted to fall into the position indicated in Fig. 51, in which position the projection 542 on the member is in front of the block 538 at the lower end of the tripping lever 520. A spring 551 stretched between pins on the tripping lever 540 and an upwardly extending arm of the sliding member 534 tends to return the member to its forward position. After being thrown into operation, the clutch makes two revolutions and imparts one-half a revolution to the pulling over cams, the tripping lever 520, during the first revolution of the clutch, being retained in its inoperative position by the member 536, which prevents return movement of the lever after the slide 534 is released by the treadle actuated lever arm 550. At some time during the second revolution of the clutch, the tripping lever 520 is released through connections actuated by a cam of the pulling over bank and when so released is pulled by a spring 552 connected to the lower end of the lever into a position in which its upper end bears against the periphery of the clutch ring 494 and the block 522 at the upper end of the lever is in the path of the shoulder 498 on the ring. The cam actuated connections for releasing the tripping lever 520 comprise a cam actuated lever 554, see Figs. 46 and 47, a bell crank 556 pivotally mounted on the machine base, a link 558 connecting the vertical arm of the bell crank 556 with the lever 554 and a link 560 depending from the horizontal arm of the bell crank 556 and provided at its lower end with a cross pin 562 beneath both sliding members 534 and 536. With this construction and arrangement of parts, a movement of the bell crank 556 in a clockwise direction raises both sliding members 534 and 536 free of the tripping lever 520 and it is to be noted that when so freed, the tripping lever can move under the force of spring 552 into a position to throw out the clutch whether or not the foot treadle has been released to permit a movement of the lever 550 away from the slide 534, see Fig. 52. The cam for actuating the lever 554 is a peripheral cam and the follower on the lever is held in contact with the cam by a spring 564 stretched between the lower end of the lever and a fixed point on the machine base.

After being thrown out of operation, the clutch for driving the pulling over cams remains at rest while the clutch for driving the thread fastener cams which is thrown into operation, as will be presently described, is making two revolutions. The clutch for actuating the pulling over cams is then again thrown into operation by an actuation of the tripping lever 520. This second movement of the tripping lever 520 is produced by a backward movement of the sliding member 536 by the cam actuated arm 546, which sliding member, prior to this time, has been moved forwardly by the cam actuated arm 546 so as to permit the projection 542 at the forward end of the slide to drop in front of the block 538 at the lower end of the tripping lever. The cam actuated arm 546 is secured to the pivot shaft 566 (see Fig. 46), to which shaft is also rigidly secured an arm 568 provided with a follower engaging a cam of the thread fastener bank of cams. The cam which engages the follower on the arm 568 is a peripheral cam and the follower is maintained in contact with the cam by a spring 570 stretched between a pin on an upstanding arm of the sliding member 536 and a pin on the tripping lever 520. After being thrown into operation by the cam actuated slide 536, the clutch for driving the pulling over cams makes two revolutions and is then again thrown out of operation in the manner hereinbefore described by the action of the connections actuated from the cam lever 554 comprising the bell crank 556, connecting link 558, depending link 560 and a cross pin 562.

The clutch for driving the thread fastener cams, as has been hereinbefore stated, when thrown into operation, makes two revolutions and drives the thread fastener cams through one complete revolution. The driving connection between the clutch and the cams (see Figs. 46, 49 and 50) comprises the gear teeth 508 on the driven member of the clutch which meshes with the gear 572 formed on one of the cam disks of the bank of thread fastener cams. The mechanism for throwing the clutch into and out of operation comprises a tripping lever 574 similar to the tripping lever 520 of the mechanism for controlling the clutch which drives the bank of pulling over cams. The mechanism for actuating and releasing the tripping lever 574 is the same in all essential particulars as the cam actuated mechanism for actuating and releasing the tripping lever 520. Referring to Figs. 46 and 49, the sliding member 576 corresponds to the sliding member 536 and is pivotally connected at its rear end to the lower end of the downwardly extending arm of a lever 578, the other arm of which lever (see Fig. 46) is provided with a follower engaging a peripheral cam of the thread fastener bank of cams. A spring 579 corresponding to the spring 558 holds the follower in contact with its cam. The bell crank 580 corresponds to the bell crank 556 of the mechanism hereinbefore described and is connected by a link 582 corresponding to the link 558 to the lower end of the downwardly extending arm of a lever 584, the other arm of which is provided with a follower engaging a peripheral cam of the thread fastener bank of cams (see Fig. 46), the cam by a spring 585 connecting the lever with a fixed point on the machine base. The link 586, depending from a horizontal arm of the bell crank 580 and provided with a cross pin 588, corresponds to the depending link and cross pin of the mechanism hereinbefore described and upon actuation of the bell crank 580 in a clockwise direction by the cam of the thread fastener bank, operates during the second revolution of the Horton clutch to raise the slide 576 and permit the tripping lever 574 to return under the force of spring 590 to a position in which the clutch is thrown out of operation at the completion of its second revolution.

As has been hereinbefore stated, the upper pulling grippers are caused to open at the proper time during the operation of the machine and the shoe support is permitted to be lowered at the end of the operation of the machine through connections comprising links 324 and 326 (see Figs. 2 and 29), which are connected at their lower ends to the slide releasing levers 314 and 320. At its upper end, the link 324 (see Fig. 2), is connected to an arm projecting from the hub of the cam actuated lever 554 and the link 326 is connected to one arm of a lever 592, the other arm of which is provided with a follower engaging a peripheral cam of the bank of pulling over cams.

The connections between the treadle 270 and the lever 550, through which the tripping lever of the clutch for actuating the bank of pulling over cams is actuated, comprise a link 594 pivotally connected at its upper end to the downwardly extending arm of the lever 550 and provided at its lower end with a slot 595 engaging a pin on an arm 598 rigidly secured to the pivot 282 of the lever 280 (see Fig. 2). The pin and slot connection between the arm 598 and the link 594 permits a preliminary downward movement of the treadle 270 and the connected lever 280 to effect closing of the pulling over grippers and a preliminary upward movement of the shoe support, as hereinbefore described. Thereafter, continued downward movement of the treadle 270 raises the link 594 and through the lever 550, throws the clutch for driving the bank of pulling over cams into operation. To provide the operator with an indication that the limit of the preliminary downward movement of the treadle 270 has been reached, a yielding stop in the form of a collar 600 is mounted on the link 278 which connects the treadle 270 with the lever 280 and is pressed upon by a spring 602 surrounding the rod and interposed between the collar 600 and a block 604 to which the upper end of the rod 278 is secured and which is pivotally mounted in the lever 280. The collar 600 is located so as to be brought into contact with the base of the machine frame at the end of the preliminary downward movement of the treadle 270 which, during its continued downward movement, must overcome the added pressure of the spring 602.

In Figs. 56, 57 and 58, a modified construction is illustrated by which not only the pulling over grippers are closed, but also the preliminary upward movement is imparted to the shoe support, by fluid pressure controlled by valves operated from the foot treadle and thereby the exertion required of the operator is considerably lessened. Referring to these figures, the slides 290 and 292 are constructed, arranged and operated as in the construction already described. These slides operate bell cranks 606 and 608, corresponding to bell cranks 298 and 300 of the previously described construction. The horizontal arm of the bell crank 608 is connected by a link to the stem of a piston valve 610, as in the previously described construction, but the bell crank 606, instead of being connected to the mechanism for raising the shoe support, is connected by a downwardly extending link 612 to the stem of a piston valve 614. The valves 610 and 614 extend through a casing 616 in the tank 344, which casing, in the construction illustrated in Figs. 56 and 57, is provided with a chamber 618 and with two additional chambers 620 and 622. The valve 610 extends through the chambers 618 and 620 into the tank 344 and the valve 614 extends through the chambers 618 and 622 into the tank 344. The construction is such that when both valves are in their lowest position, the chambers 620 and 622 are in communication with the tank 344, while communication is shut off between the chamber 618 and the chambers 620, 622. Upon raising the valve 610, chamber 618 is placed in communication with chamber 620, while communication between chamber 620 and tank 344 is shut off. Likewise, upon raising valve 614, communication is established between chamber 618 and chamber 622, while communication between chamber 622 and tank 344 is shut off. In the construction illustrated in Figs. 56 and 57, fluid under pressure is supplied to the chamber 618 from the pump 332 through the pipe 333, as in the construction hereinbefore described, and from the tank 344, the pipe 346 leads to the exhaust side of the pump. To impart the preliminary upward movement to the shoe support, a piston 624 is mounted in a cylinder chamber communicating with the chamber 622 and is connected at its upper end to an upwardly extending link 626 corresponding to the link 302 hereinbefore described and connected at its upper end in the same manner to the cam actuated mechanism for raising the shoe support. The result of this construction is that when the valve 614 is raised, the pressure of the fluid supplied to the chamber 622 forces the plunger 624 upwardly and imparts the desired preliminary upward movement to the shoe support. Relief of the pressure in the chamber 622 by the downward movement of the valve 614 permits the piston 624 to descend. To utilize the construction in Figs. 56 and 57 to close the upper pulling grippers, a pipe 627 is provided opening at its lower end into the chamber 620 and at its upper end connecting with the pipe 336 through which fluid is supplied to the cylinders of the upper pulling gripper mechanism. With this construction, a shut-off valve is provided in the pipe 336 between the points of connection with the pipes 333 and 627. With this construction, as will be obvious, fluid under pressure supplied to the chamber 620 by raising the valve 610 will pass upwardly through the pipe 627 and through the connecting pipes close the upper pulling grippers while the relief of the pressure by the downward movement of the valve will permit the grippers to open.

The construction and arrangement of parts hereinbefore described for supporting and actuating the shoe support 8 comprising the arms 16 and the curved guideways 24 cause the shoe support to be moved upwardly and forwardly in a curved path. With certain shapes of last and with some upper materials, it is desirable to cause the shoe support to move upwardly and forwardly in a right line and also to adapt the machine for better operation on different shapes of last and different materials to be able to change the ratio of the forward to the upward movement and thereby change to the desired extent the direction of pull of the grippers with relation to the last. A construction and arrangement of parts by which both of these desirable results may be attained is illustrated in Figs. 59 to 63. In the construction illustrated in these figures, upper and lower blocks 628 and 630 are mounted on brackets 632 rigidly secured to the main frame of the machine and are provided with straight guiding slots 634, the slots in the upper blocks 628, of which there is one on each side of the shoe support, being arranged to engage rolls 636 mounted on pins projecting laterally from upstanding arms of the shoe support and the slots in the lower blocks, of which there is also one on each side of the shoe support, being arranged to engage rolls 638 on pins projecting from blocks 640 mounted in the lower rear portion of the shoe support. During its upward and downward movements, the shoe support is guided by the engagement of the rolls 636 and 638 with the guiding slots 634 in the blocks 628 and 630 and thus the shoe support, during its up and down movement, moves in a right line path, as distinguished from a curvilinear path. To change the inclination of this path, the blocks 628 and 630 are pivotally mounted on the brackets 632 and the blocks on each side of the shoe support are connected by a link 642 and each block 628 is connected by a link 644 to an adjusting frame 646 pivotally mounted on the machine frame and provided with a rearwardly extending arm in which is mounted a spring-pressed locking plunger 648 arranged to cooperate with a series of holes 650 formed in a stationary arm of the machine frame. With this construction, the block 628 and 630 can be readily adjusted to change the ratio of the forward to the upward movement of the shoe support, the effect of this adjustment being indicated graphically in Fig. 64, in which the dot-and-dash line 652 indicates the path of movement of the shoe support at one limit of the adjustment of the blocks 628 and 630, and the line 654 indicates the path of the shoe support at the other limit of the adjustment of the blocks.

In the construction illustrated in Figs. 59 to 63, the shoe support is raised and lowered by the cam actuated lever and the toggle link connections used in the previously described construction, the toggle link being connected to a lever arm 656 which corresponds to the lever arm 360 hereinbefore described. The lever arm 656 is integral with a sleeve mounted on the pivot shaft 18, which sleeve is provided with forwardly extending arms 658 provided at their forward ends with rolls 660 engaging slots 662 in the blocks 640, which slots are parallel to the guideways for the blocks 640 in the shoe support 8.

The nature and scope of the invention having been indicated and a particular embodiment of the invention having been described, what is claimed is:

1. A pulling over machine for use in the manufacture of stitchdown shoes having, in combination, a shoe support to receive a last with a sole and upper thereon, upper engaging devices including grippers on opposite sides of the support at the forepart of the last, means for imparting relative movement heightwise of the last to said support and devices to pull the upper over the last with the margin of the upper outturned over the projecting sole, fastener inserting devices, and mechanism for actuating said devices to insert fasteners securing the upper to the sole.

2. A pulling over machine for use in the manufacture of stitchdown shoes having, in combination, a shoe support to receive a last with a sole and an upper thereon, upper engaging devices including grippers on opposite sides of the support at the forepart of the last, means for imparting relative movement heightwise of the last to said support and devices to pull the upper over the last, means for clamping the outturned margin of the upper against the surface of the projecting sole, fastener inserting devices, and mechanism for actuating said devices to insert fasteners through the clamped upper and sole.

3. A pulling over machine for use in the manufacture of stitchdown shoes having, in combination, a shoe support to receive a last with a sole and upper thereon, upper engaging devices including grippers on opposite sides of the support at the forepart of the last, means for imparting relative movement heightwise of the last to said support and devices to pull the upper over the last with the margin of the upper outturned over the projecting sole, devices for forming thread fasteners, and mechanism for actuating said devices to insert thread fasteners through the outturned margins of the upper and the projecting sole.

4. A pulling over machine for use in the manufacture of stitchdown shoes having, in combination, a shoe support to receive a last with a sole and upper thereon, upper engaging devices including grippers on opposite sides of the support at the forepart of the last, means for imparting relative movement heightwise of the last to said support and devices to pull the upper over the last with the margin of the upper outturned over the projecting sole, a needle at each side of the support and devices cooperating therewith to form a thread fastener, and mechanism for actuating the needle and said devices to perforate the upper and sole at a plurality of points and form fasteners of thread surrounding the material of both the upper and sole between said points.

5. A pulling over machine for use in the manufacture of stitchdown shoes having, in combination, a shoe support to receive a last with a sole and upper thereon, upper engaging grippers at opposite sides of the support at the forepart of the last arranged to hold the marginal portions of the upper outturned away from the last and to press the upper against the sides of the last, wiper plates on opposite sides of the support spaced from the grippers lengthwise of the last and arranged to press the upper against the sides of the last at substantially the same level heightwise of the last as the grippers, and means for imparting relative movement heightwise of the last to the shoe support and to the grippers and wiper plates to pull the upper over the last.

6. A pulling over machine for use in the manufacture of stitchdown shoes having, in combination, a shoe support to receive a last with a sole and upper thereon, upper engaging grippers on opposite sides of the support at the forepart of the last, wiper plates on opposite sides of the support arranged to press the upper against the sides of the last, means for imparting relative movement heightwise of the last to the shoe support and grippers and wiper plates to pull the upper over the last, means for clamping the outturned margin of the upper and the projecting sole against the wiper plates, fastener inserting devices, and means for actuating said devices to insert fasteners through the clamped portions of the upper and sole.

7. A pulling over machine for use in the manufacture of stitchdown shoes having, in combination, a shoe support to receive a last with a sole and an upper thereon, upper engaging devices including grippers on opposite sides of the support at the forepart of the last arranged to hold the marginal portions of the upper outturned away from the last, means for imparting relative movement heightwise of the last to said support and devices to pull the upper over the last, and means for holding the grippers in position to bear against the upper and press the upper against the sides of the last during such relative movement.

8. A pulling over machine for use in the manufacture of shoes having, in combination, a shoe support to receive a last with a sole and upper thereon, upper engaging grippers on opposite sides of the support at the forepart of the last, wiper plates on opposite sides of the support spaced from the grippers lengthwise of the last and arranged to press the upper against the sides of the last, and means for imparting relative movement heightwise of the last to the shoe support and the grippers and wiper plates to pull the upper over the last.

9. A pulling over machine for use in the manufacture of stitchdown shoes having, in combination, a shoe support to receive a last with a sole and upper thereon, upper engaging grippers on opposite sides of the support at the forepart of the last, wiper plates on opposite sides of the support arranged to press the upper against the sides of the last and to support the outturned margins of the upper and the projecting sole against the thrust of fastener inserting devices, means for imparting relative movement heightwise of the last to the shoe support and grippers and wiper plates to pull the upper over the last, fastener inserting devices, and means for actuating said devices to insert fasteners through the outturned margins of the upper and the projecting sole while supported by the wiper plates.

10. A pulling over machine for use in the manufacture of shoes having, in combination, a shoe support to receive a last with a sole and an upper thereon, upper engaging devices including a gripper and a wiper plate at each side of the support at the forepart of the last, a carrier at each side of the support on which a gripper and a wiper plate are mounted, means for imparting relative movement heightwise of the last to said support and carriers to pull the upper over the last, and means for supporting the carriers having provision for adjusting the carriers angularly about axes extending heightwise of the last.

11. A pulling over machine for use in the manufacture of shoes having, in combination, a shoe support to receive a last with a sole and an upper thereon, upper engaging devices including a gripper and a wiper plate at each side of the support at the forepart of the last, a carrier at each side of the support on which a gripper and a wiper plate are mounted, means for imparting relative movement heightwise of the last to said support and carriers to pull the upper over the last, means for manually adjusting the carriers towards and from the shoe support, and power operated means for moving the carriers towards the shoe support to cause the wiper plates to press the upper against the sides of the last.

12. A pulling over machine for use in the manufacture of shoes having, in combination, a shoe support to receive a last with a sole and an upper thereon, upper engaging devices including a gripper and a wiper plate at each side of the support at the forepart of the last, a carrier at each side of the support on which a gripper and a wiper plate are mounted, means for imparting relative movement heightwise of the last to said support and carriers to pull the upper over the last, means for manually adjusting the carriers angularly about axes extending heightwise of the last, and power operated means for moving the carriers towards the shoe support to cause the wiper plates to press the upper against the sides of the last.

13. A pulling over machine for use in the manufacture of shoes having, in combination, a shoe support to receive a last with a shoe and upper thereon, upper engaging devices including grippers on opposite sides of the support at the forepart of the last, means for imparting movement heightwise of the last and longitudinally of the last to said support to pull the upper over the last, and means for changing the ratio of the movements heightwise and longitudinally of the last.

14. A pulling over machine for use in the manufacture of shoes having, in combination, a shoe support to receive a last with a shoe and upper thereon, upper engaging devices including grippers on opposite sides of the support at the forepart of the last, means for imparting to the shoe support a movement heighwise of the last and longitudinally of the last towards the heel of the last, and means for changing the ratio of said movements imparted to the shoe support.

15. A pulling over machine for use in the manufacture of stitchdown shoes having, in combination, a shoe support to receive a last with a sole and upper thereon, upper engaging grippers at opposite sides of the support at the forepart of the last arranged to hold the marginal portions of the upper outturned away from the last and to press the upper against the sides of the last, wiper plates on opposite sides of the support spaced from the grippers lengthwise of the last, a carrier at each side of the support on which a gripper is yieldingly mounted and on which a wiper plate is rigidly mounted, means for yieldingly moving the carriers towards the shoe support to cause the grippers and wiper plates to press the upper against the sides of the last, and means for imparting relative movement heightwise of the last to the shoe support and to the grippers and wiper plates to pull the upper over the last.

16. A pulling over machine for use in the manufacture of stitchdown shoes having, in combination, a shoe support to receive a last with a sole and upper thereon, upper engaging grippers at opposite sides of the support at the forepart of the last arranged to hold the marginal portions of the upper outturned away from the last and to press the upper against the sides of the last, wiper plates on opposite sides of the support spaced from the grippers lengthwise of the last, a carrier at each side of the support on which a gripper is yieldingly mounted and on which a wiper plate is rigidly mounted, means for yieldingly moving the carriers towards the shoe support to cause the grippers and wiper plates to press the upper against the sides of the last, means for imparting relative movement heightwise of the last to the shoe support and to the grippers and wiper plates to pull the upper over the last, means for locking the grippers from movement with relation to the carriers, and means for unlocking the grippers prior to pressing the upper against the sides of the last.

17. A pulling over machine for use in the manufacture of stitchdown shoes having, in combination, a shoe support to receive a last with a sole and upper thereon, upper engaging devices including grippers on opposite sides of the support at the forepart of the last, means for imparting relative movement heightwise of the last to said support and devices to pull the upper over the last with the margin of the upper outturned over the projecting sole, an eye pointed needle at each side of the support, mechanism for actuating the needle while the work remains stationary to push four loops of thread through the sole and upper at four separated points, devices cooperating with the needle, and mechanism for actuating said cooperating devices to pass the first and third loops through the second and fourth loops and tighten the encircling loops to form thread fasteners.

18. A pulling over machine for use in the manufacture of shoes having, in combination, a shoe support to receive a last with a sole and upper thereon, upper engaging devices including grippers on opposite sides of the support at the forepart of the last, treadle controlled mechanisms for closing the grippers and for imparting a preliminary relative movement heightwise of the last to said support and devices and for opening the grippers and imparting a return relative movement to said support and devices to permit adjustment of the upper on the last, and power operated means rendered operative by further movement of the treadle after said preliminary movement for imparting relative movement heightwise of the last to said support and devices to pull the upper over the last.

19. A pulling over machine for use in the manufacture of shoes having, in combination, a shoe support to receive a last with a sole and upper thereon, upper engaging devices including grippers on opposite sides of the support at the forepart of the last, a treadle, mechanism controlled by the tradle acting upon a partial depression of the treadle to close the grippers and to impart a preliminary relative movement heightwise of the last to said support and devices and acting upon release of the treadle to open the grippers and impart a return relative movement to said support and devices to permit adjustment of the upper on the last, power operated means for imparting relative movement heightwise of the last to said support and devices to pull the upper over the last, connections for rendering said power operated means operative arranged to be actuated by further movement of the treadle after said preliminary movement, locking devices for locking said connections against return movement, and power operating connections for throwing said locking devices out of operation.

20. A pulling over machine for use in the manufacture of shoes having, in combination, pulling over and fastener inserting devices, said pulling over devices including a shoe support to receive a last with a sole and upper thereon, and upper engaging devices including grippers on opposite sides of the support at the forepart of the last, and said fastener inserting devices including devices to insert fasteners securing the margins of the upper to the shoe sole, a bank of cams and suitable connections for actuating the pulling over devices to pull the upper over the last, a bank of cams and suitable connections for actuating the fastener inserting devices to insert fasteners securing the upper to the sole, power operated means for driving the cams, treadle controlled means for throwing the pulling over cams into operation, power operated means for throwing the pulling over cams out of operation and for throwing the fastener inserting cams into operation, means controlled by the fastener cams for throwing the fastener cams out of operation and simultaneously throwing the pulling over cams again into operation, and means actuated by the pulling over cams for throwing the pulling over cams out of operation.

21. A pulling over machine for use in the manufacture of shoes having, in combination, pulling over and fastener inserting devices, said pulling over devices including a shoe support to receive a last with a sole and upper thereon, and upper engaging devices including grippers on opposite sides of the support at the forepart of the last, and said fastener inserting devices including devices to insert fasteners securing the margins of the upper to the shoe sole, a bank of cams and suitable connections for actuating the pulling over devices to pull the upper over the last, a bank of cams and suitable connections for actuating the fastener inserting devices to insert fasteners securing the upper to the sole, power operated means for driving the cams, and means for throwing said cams into and out of operation acting to throw the pulling over cams into operation and continue them in operation while the fastener inserting cams remain stationary, and to throw the pulling over cams out of operation and to throw the fastener inserting cams into operation.

22. A pulling over machine for use in the manufacture of shoes having, in combination, pulling over and fastener inserting devices, said pulling over devices including a shoe support to receive a last with a sole and upper thereon, and upper engaging devices including grippers on opposite sides of the support at the forepart of the last, and said fastener inserting devices including devices to insert fasteners securing the margins of the upper to the shoe sole, a bank of cams and suitable connections for actuating the pulling over devices to pull the upper over the last, a bank of cams and suitable connections for actuating the fastener inserting devices to insert fasteners securing the upper to the sole, power operated means for driving the cams, and means for throwing said cams into and out of operation acting to throw the pulling over cams into operation and continue them in operation while the fastener inserting cams remain stationary, and to throw the pulling over cams out of operation and to throw the fastener inserting cams into operation and continue them in operation while the pulling over cams remain stationary and to throw the fastener inserting cams out of operation and the pulling over cams again into operation.

23. A pulling over machine for use in the manufacture of stitchdown shoes having, in combination, a shoe support to receive a last with a projecting sole and an upper thereon, upper engaging devices including grippers on opposite sides of the support at the forepart of the last, means for imparting relative movement heightwise of the last to said support and devices to pull the upper over the last and to press the outturned margin of the upper against the upper surface of the projecting sole, fastener inserting devices, and means for actuating said fastener inserting devices to insert fasteners heightwise of the shoe through the outturned upper and the projecting sole.

24. A pulling over machine for use in the manufacture of stitchdown shoes having, in combination, a shoe support to receive a last with a projecting sole and an upper thereon, upper engaging grippers on opposite sides of the support arranged to hold the gripped upper in outturned relation to the last, means for moving the support and grippers relatively to each other heightwise of the last to pull the upper over the last and to press the outturned margin of the upper against the upper face of the projecting sole, fastener inserting devices, and means for actuating said fastener inserting devices to insert fasteners through the outturned upper and the projecting margin of the sole while the upper is pressed against the sole.

25. A pulling over machine for use in the manufacture of stitchdown shoes having, in combination, a shoe support to receive a last with a projecting sole and an upper thereon, grippers on opposite sides of the support at the forepart of the last arranged to hold the upper in outturned relation to the last, means for imparting relative movement heightwise of the last to said support and grippers to pull the upper over the last and to press the outturned margin of the upper against the upper surface of the projecting sole, fastener inserting devices, and means for actuating said fastener inserting devices to insert fasteners heightwise of the shoe through the outturned upper and the projecting sole in the angle between the side of the last and the projecting sole.

26. A pulling over machine for use in the manufacture of stitchdown shoes having, in combination, a shoe support to receive a last with a projecting sole and an upper thereon, grippers on opposite sides of the support at the forepart of the last manually operated means for imparting relative movement heightwise of the last to said support and grippers to pull the upper over the last, power operated means for clamping the outturned upper and the projecting margin of the sole together, and power operated means for inserting fasteners through the upper and the sole heightwise of the shoe while the upper and sole are clamped together, said power operated means being set in operation by final movement of said manually operated means.

27. A pulling over machine for use in the manufacture of stitchdown shoes having, in combination, a shoe support to receive a last with a projecting sole and an upper thereon, grippers on opposite sides of the support at the forepart of the last arranged to hold the upper in outturned relation to the last, manually operated means for imparting relative movement heightwise of the last to said support and gripper to pull the upper over the last, and power operated fastener inserting devices set in operation by final movement of said manually operated means and acting to insert fasteners heightwise of the shoe through the outturned upper and the projecting sole in the angle between the side of the last and the projecting sole.

28. A pulling over machine for use in the manufacture of shoes having, in combination, a shoe support to receive a last with a sole and upper thereon, upper engaging devices including grippers on opposite sides of the support at the forepart of the last, means for imparting movement heightwise of the last to said support to pull the upper over the last with the margin of the upper outturned over the projecting sole, fastener inserting devices, and mechanism for actuating said devices to insert fasteners securing the upper to the sole.

29. A pulling over machine for use in the manufacture of stitchdown shoes having, in combination, a shoe support to receive a last with a projecting sole and an upper thereon, grippers on opposite sides of the support at the forepart of the last arranged to hold the upper in outturned relation to the last, manually operated means for imparting movement height wise of the last to said support relatively to the grippers to pull the upper over the last, and power operated fastener inserting devices set in operation by final movement of said manually operated means and acting to insert fasteners heightwise of the shoe through the outturned upper and the projecting sole in the angle between the side of the last and the projecting sole.

30. A pulling over machine for use in the manufacture of stitchdown shoes having, in combination, a shoe support to receive a last with a projecting sole and an upper thereon, grippers on opposite sides of the support at the forepart of the last, manually operated means for imparting movement heightwise of the last to said support relatively to the grippers to pull the upper over the last, power operated means for clamping the outturned upper and the projecting margin of the sole together, and power operated means for inserting fasteners through the upper and the sole heightwise of the shoe while the upper and sole are clamped together, said power operated means being set in operation by final movement of said manually operated means.

ERIC A. HOLMGREN.